United States Patent
Horn et al.

(10) Patent No.: US 8,571,550 B2
(45) Date of Patent: Oct. 29, 2013

(54) MANAGING ACCESS CONTROL TO CLOSED SUBSCRIBER GROUPS

(75) Inventors: Gavin B. Horn, La Jolla, CA (US); Osok Song, San Diego, CA (US); Ramachandran Subramanian, San Diego, CA (US); Parag A. Agashe, San Diego, CA (US); Damanjit Singh, San Diego, CA (US); Miguel Griot, Dana Point, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 12/701,319

(22) Filed: Feb. 5, 2010

(65) Prior Publication Data

US 2010/0203865 A1   Aug. 12, 2010

Related U.S. Application Data

(60) Provisional application No. 61/151,086, filed on Feb. 9, 2009, provisional application No. 61/220,536, filed on Jun. 25, 2009, provisional application No. 61/223,342, filed on Jul. 6, 2009, provisional application No. 61/226,520, filed on Jul. 17, 2009, provisional application No. 61/245,616, filed on Sep. 24, 2009, provisional application No. 61/254,150, filed on Oct. 22, 2009.

(51) Int. Cl.
*H04W 4/00* (2009.01)

(52) U.S. Cl.
USPC ........................................ 455/435.1; 455/434

(58) Field of Classification Search
USPC ....................................... 455/411, 435.1, 434
See application file for complete search history.

(56) References Cited

U.S. PATENT DOCUMENTS

| 6,826,414 | B1 | 11/2004 | Reynolds et al. |
| 2003/0040313 | A1 | 2/2003 | Hogan et al. |

(Continued)

FOREIGN PATENT DOCUMENTS

| JP | 2009505547 A | 2/2009 |
| JP | 2010525752 A | 7/2010 |

(Continued)

OTHER PUBLICATIONS

International Search Report and Written Opinion—PCT/US2010/040049, International Search Authority—European Patent Office—Oct. 13, 2010.

(Continued)

*Primary Examiner* — Steven Lim
(74) *Attorney, Agent, or Firm* — François A. Pelaez

(57) ABSTRACT

Systems and methodologies are described that facilitate managing access control to Closed Subscriber Groups (CSGs) in a wireless communication environment. A user equipment (UE) can store an operator CSG list, which can be read only and controlled by an operator. Further, the operator CSG list can lack synchronization to a CSG subscription for the UE retained in the network. Thus, upon selecting to access a CSG cell associated with a CSG with a corresponding CSG Identifier (ID) included in the operator CSG list of the UE, a reject message that indicates that the UE lacks authorization for the CSG can be received. Moreover, the CSG ID can be stored as a forbidden CSG ID of the UE in a set of forbidden CSG IDs in response to receipt of the reject message when the CSG ID is included in the operator CSG list.

70 Claims, 16 Drawing Sheets

(56) References Cited

U.S. PATENT DOCUMENTS

| | | |
|---|---|---|
| 2006/0040661 A1 | 2/2006 | Choi et al. |
| 2006/0084443 A1* | 4/2006 | Yeo et al. ............... 455/449 |
| 2006/0123083 A1* | 6/2006 | Goutte et al. ............ 709/206 |
| 2008/0194235 A1 | 8/2008 | Dalsgaard et al. |
| 2008/0267153 A1 | 10/2008 | Mukherjee et al. |
| 2008/0305801 A1 | 12/2008 | Burgess et al. |
| 2009/0086672 A1* | 4/2009 | Gholmieh et al. .......... 370/329 |
| 2009/0156208 A1 | 6/2009 | Vesterinen et al. |
| 2009/0191857 A1 | 7/2009 | Horn et al. |
| 2009/0270092 A1* | 10/2009 | Buckley et al. ........... 455/434 |
| 2010/0075670 A1* | 3/2010 | Wu ...................... 455/434 |
| 2010/0161794 A1 | 6/2010 | Horn et al. |
| 2010/0268937 A1 | 10/2010 | Blom et al. |
| 2010/0278108 A1 | 11/2010 | Cho et al. |
| 2011/0041003 A1 | 2/2011 | Pattar et al. |
| 2011/0179168 A1* | 7/2011 | Nylander et al. .......... 709/225 |
| 2011/0183647 A1* | 7/2011 | Dalsgaard et al. ......... 455/411 |
| 2011/0223887 A1 | 9/2011 | Rune et al. |
| 2011/0237250 A1 | 9/2011 | Horn et al. |
| 2012/0039213 A1 | 2/2012 | Cheng et al. |

FOREIGN PATENT DOCUMENTS

| | | |
|---|---|---|
| JP | 2010537480 A | 12/2010 |
| JP | 2011530250 A | 12/2011 |
| JP | 2012511749 A | 5/2012 |
| JP | 2012513732 A | 6/2012 |
| WO | 2007020515 A1 | 2/2007 |
| WO | 2008134281 A2 | 11/2008 |
| WO | 2009022976 A1 | 2/2009 |
| WO | WO2010059122 | 5/2010 |
| WO | 2010067221 A1 | 6/2010 |
| WO | 2010075470 A1 | 7/2010 |

OTHER PUBLICATIONS

3GPP TSG CT WG1: "LS on Introduction of the Operator CSG List" 3GPP Draft; S1-093207, 3rd Generation Partnership Project (3GPP), Mobile Competence Centre; 650, Route Des Lucioles; F-06921 Sophia-Antipolis Cedex; France, No. Roma; Jul. 23, 2009, XP050355527, the whole document.

3GPP TSG SA WG1: "Reply to LS on Introduction of the Operator CSG List" 3GPP Draft; C1-093287, 3rd Generation Partnership Project (3GPP), Mobile Competence Centre; 650, Route Des Lucioles; F-06921 Sophia-Antipolis Cedex; France, No. Sevilla; Aug. 11, 2009, XP050350203, the whole document.

International Search Report & Written Opinion—PCT/US2010/023677, International Search Authority—European Patent Office, May 17, 2010.

Qualcomm Europe et al: Oct. 12, 2009 , 3GPP Draft; C1-094799, 3rd Generation Partnership Project (3GPP), Mobile Competence Centre; 650, Route Des Luciols; F-06921 Sophia-Antipolis Cedex ; France , XP0150383516, the whole document.

Competence Centre; 650, Route Des Lucioles; F-06921 Sophia-Antipolis Cedex; France, XP050383516, the whole document.

Taiwan Search Report—TW099103839—TIPO—Feb. 13, 2013.

3GPP SA WG1, "LS on CSG support from roaming subscribers and Manual CSG Selection", 3GPP TSG RAN WG2 Meeting #65bis, 3GPP, R2-092006, Release 9, Mar. 27, 2009.

3GPP TS 133 220 v8.7.0 3rd Generation Partnership Project; Technical Specification Group Services and System Aspects; Generic Authentication Architecture (GAA); Generic bootstrapping architecture (Release 9) available Jun. 12, 2009 pp. 1-14.

\* cited by examiner

MANAGING ACCESS CONTROL TO CLOSED SUBSCRIBER GROUPS

CLAIM OF PRIORITY UNDER 35 U.S.C. §119

The present application for patent claims priority to Provisional Application No. 61/151,086 entitled "SYSTEMS AND METHODS TO MANAGE ACCESS CONTROL TO CLOSED SUBSCRIBER GROUPS" filed Feb. 9, 2009; Provisional Application No. 61/220,536, entitled "MANAGEMENT OF OPERATOR CSG LIST AND VPLMN-AUTONOMOUS CSG ROAMING" filed Jun. 25, 2009; Provisional Application No. 61/223,342, entitled "MANAGEMENT OF OPERATOR CSG LIST AND VPLMN-AUTONOMOUS CSG ROAMING" filed Jul. 6, 2009; Provisional Application No. 61/226,520, entitled "MANAGEMENT OF OPERATOR CSG LIST AND VPLMN-AUTONOMOUS CSG ROAMING" filed Jul. 17, 2009; Provisional Application No. 61/245,616, entitled "MANAGEMENT OF OPERATOR CSG LIST AND VPLMN-AUTONOMOUS CSG ROAMING" filed Sep. 24, 2009; and Provisional Application No. 61/254,150, entitled "MANAGEMENT OF OPERATOR CSG LIST AND VPLMN-AUTONOMOUS CSG ROAMING" filed Oct. 22, 2009. The aforementioned Provisional Applications are assigned to the assignee hereof and hereby expressly incorporated by reference herein.

BACKGROUND

1. Field

The following description relates generally to wireless communications, and more particularly to managing access control to Closed Subscriber Group (CSG) cells in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO) systems, multiple-input multiple-output (MIMO) systems, and so forth. In addition, UEs can communicate with other UEs (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to UEs using a wireless technology (e.g., 3GPP Universal Mobile Telecommunications System (UMTS) or Long Term Evolution (LTE), 1× Evolution-Data Optimized (1×EV-DO), . . . ) to communicate with the UEs and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, or the like. Examples of other types of base stations include pico cell base stations, micro cell base stations, and so forth.

In some scenarios, some femto cell base stations or other base stations in a network can be restricted for access in some manner. For example, different base stations in the network can belong to different Closed Subscriber Groups (CSGs). In various situations, access control issues can arise due to a lack of synchronization between a UE and a network. More particularly, a UE can use some form of list (e.g., whitelist, . . . ) to identify base stations that the UE is allowed to access. The list retained by the UE can be read only and operator controlled. Further, the network can have an equivalent list. A problem can arise if the UE is removed from a CSG. For example, if the UE is removed from a CSG, and the list stored by the UE is not updated before the UE attempts to access a CSG cell from the CSG, then the UE can receive a reject message indicating that the UE lacks authorization for this CSG. Further, since the list stored by the UE is read only, the UE can be unauthorized to change entries in the list stored by the UE, and thus, unable to remove the CSG from such stored list. With the CSG still included in the list stored by the UE, the UE can again attempt to access the CSG cell from the CSG, and again receive a reject message indicating that the UE lacks authorization for this CSG.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating managing of access control to Closed Subscriber Groups (CSGs) in a wireless communication environment. A user equipment (UE) can store an operator CSG list, which can be read only and controlled by an operator. Further, the operator CSG list can lack synchronization to a CSG subscription for the UE retained in the network. Thus, upon selecting to access a CSG cell associated with a CSG with a corresponding CSG Identifier (ID) included in the operator CSG list of the UE, a reject message that indicates that the UE lacks authorization for the CSG can be received. Moreover, the CSG ID can be stored as a forbidden CSG ID of the UE in a set of forbidden CSG IDs in response to receipt of the reject message when the CSG ID is included in the operator CSG list.

According to related aspects, a method is described herein. The method can include selecting to access a Closed Subscriber Group (CSG) cell associated with a CSG with a corresponding CSG Identifier (ID) included in an operator CSG list of a user equipment (UE), the operator CSG list being read only and controlled by an operator. Further, the method can include receiving a reject message that indicates the UE lacks authorization for the CSG. Moreover, the method can include storing the CSG ID as a forbidden CSG ID of the UE in a set of forbidden CSG IDs in response to receipt of the reject message when the CSG ID is included in the operator CSG list.

Another aspect relates to a wireless communications apparatus. The wireless communications apparatus can include at least one processor. The at least one processor can be configured to select to access a Closed Subscriber Group (CSG) cell associated with a CSG with a corresponding CSG Identifier (ID) included in an operator CSG list of a user equipment (UE), the operator CSG list being read only and controlled by an operator. Moreover, the at least one processor can be configured to receive a reject message that indicates the UE lacks authorization for the CSG. Further, the at least one processor can be configured to retain the CSG ID as a forbidden CSG ID of the UE in a set of forbidden CSG IDs in response to receipt of the reject message when the CSG ID is included in the operator CSG list.

Yet another aspect relates to an apparatus. The apparatus can include means for selecting to access a Closed Subscriber Group (CSG) cell associated with a CSG with a corresponding CSG Identifier (ID) included in an operator CSG list of a user equipment (UE), the operator CSG list being read only and controlled by an operator. Moreover, the apparatus can include means for storing the CSG ID as a forbidden CSG ID in response to receipt of a reject message that indicates that the UE lacks authorization for the CSG when the CSG ID is included in the operator CSG list.

Still another aspect relates to a computer program product that can comprise a computer-readable medium. The computer-readable medium can include code for causing at least one computer to select to access a Closed Subscriber Group (CSG) cell associated with a CSG with a corresponding CSG Identifier (ID) included in an operator CSG list of a user equipment (UE), the operator CSG list being read only and controlled by an operator. Further, the computer-readable medium can include code for causing at least one computer to store the CSG ID as a forbidden CSG ID in response to receipt of a reject message that indicates that the UE lacks authorization for the CSG when the CSG ID is included in the operator CSG list.

Yet another aspect relates to an apparatus that can include a selection component that selects to access a Closed Subscriber Group (CSG) cell associated with a CSG with a corresponding CSG Identifier (ID) included in an operator CSG list of a user equipment (UE), the operator CSG list being read only and controlled by an operator. Moreover, the apparatus can include a forbidden CSG management component that stores the CSG ID as a forbidden CSG ID in a set of forbidden CSG IDs in response to receipt of a reject message that indicates that the UE lacks authorization for the CSG when the CSG ID is included in the operator CSG list.

In accordance with other aspects, a method is described herein. The method can include receiving a message indicating that a user equipment (UE) is not authorized for a Closed Subscriber Group (CSG). Moreover, the method can include recognizing whether a CSG Identifier (ID) corresponding to the CSG is present in an operator CSG list, the operator CSG list being read only and controlled by an operator. The method can also include inhibiting inclusion of the CSG ID in a list of allowed CSG IDs provided to an Access Stratum (AS) for cell selection when the CSG ID is present in the operator CSG list.

Another aspect relates to a wireless communications apparatus. The wireless communications apparatus can include at least one processor. The at least one processor can be configured to receive a message indicating that a user equipment (UE) is not authorized for a Closed Subscriber Group (CSG). The at least one processor can be further configured to recognize whether a CSG Identifier (ID) corresponding to the CSG is present in an operator CSG list, the operator CSG list being read only and controlled by an operator. Moreover, the at least one processor can be configured to inhibit inclusion of the CSG ID in a list of allowed CSG IDs provided to an Access Stratum (AS) for cell selection when the CSG ID is present in the operator CSG list.

Yet another aspect relates to an apparatus. The apparatus can include means for receiving a message indicating that a user equipment (UE) is not authorized for a Closed Subscriber Group (CSG). Further, the apparatus can include means for inhibiting inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

Still another aspect relates to a computer program product that can comprise a computer-readable medium. The computer-readable medium can include code for causing at least one computer to receive a message indicating that a user equipment (UE) is not authorized for a Closed Subscriber Group (CSG). Moreover, the computer-readable medium can include code for causing at least one computer to inhibit inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

Yet another aspect relates to an apparatus that can include a forbidden CSG management component that receives a message indicating that a user equipment (UE) is not authorized for a Closed Subscriber Group (CSG). Further, the apparatus can include a filter component that inhibits inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

According to other aspects, a method is described herein. The method can include receiving a message indicating that a user equipment (UE) is not authorized for a Closed Subscriber Group (CSG). Further, the method can include recognizing whether a CSG Identifier (ID) corresponding to the CSG is present in an operator CSG list, the operator CSG list being read only and controlled by an operator. Moreover, the method can include inhibiting the UE from indicating that the CSG ID is in the operator CSG list stored in the UE for manual CSG selection mode.

Another aspect relates to a wireless communications apparatus. The wireless communications apparatus can include at least one processor. The at least one processor can be configured to receive a message indicating that a user equipment (UE) is not authorized for a Closed Subscriber Group (CSG). Moreover, the at least one processor can be configured to recognize whether a CSG Identifier (ID) corresponding to the CSG is present in an operator CSG list, the operator CSG list being read only and controlled by an operator. Further, the at least one processor can be configured to inhibit the UE from indicating that the CSG ID is in the operator CSG list stored in the UE for manual CSG selection mode.

Yet another aspect relates to an apparatus. The apparatus can include means for receiving a message indicating that a user equipment (UE) is not authorized for a Closed Subscriber Group (CSG). The apparatus can further include means for inhibiting the UE from indicating that a CSG Identifier (ID) corresponding to the CSG is in an operator CSG list stored in the UE for manual CSG selection mode, the operator CSG list being read only and controlled by an operator.

Still another aspect relates to a computer program product that can comprise a computer-readable medium. The computer-readable medium can include code for causing at least one computer to receive a message indicating that a user equipment (UE) is not authorized for a Closed Subscriber Group (CSG). Moreover, the computer-readable medium can include code for causing at least one computer to inhibit the UE from indicating that a CSG Identifier (ID) corresponding to the CSG is in an operator CSG list stored in the UE for manual CSG selection mode, the operator CSG list being read only and controlled by an operator.

Yet another aspect relates to an apparatus that can include a display component that renders a list of Closed Subscriber Group (CSG) Identifiers (IDs) included in an operator CSG list stored in a user equipment (UE) for manual CSG selection, the operator CSG list being read only and controlled by an operator. Further, the apparatus can include a forbidden CSG management component that receives a message indicating that the UE is not authorized for a CSG. Moreover, the apparatus can include a filter component that inhibits the display component from indicating that a CSG ID corresponding to the CSG is in the operator CSG list stored in the UE for manual CSG selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
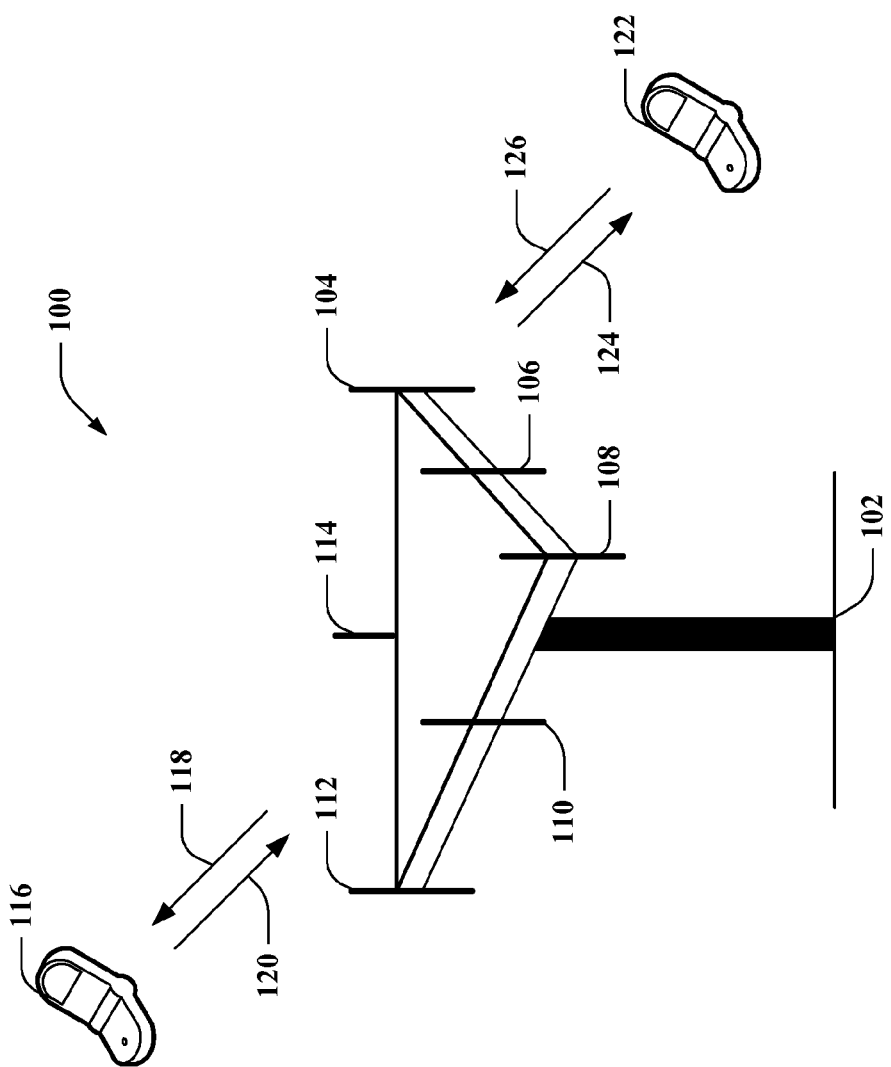
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), a femto cell, a pico cell, a micro cell, a macro cell, a Home Evolved Node B (HeNB), a Home Node B (HNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UEs 116 and 122. UEs 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UEs 116 and 122. Also, while base station 102 utilizes beamforming to transmit to UEs 116 and 122 scattered randomly through an associated coverage, UEs in neighboring cells can be subject to less interference as compared to a base station transmitting through a single antenna to all its UEs.

It is contemplated that base station 102 can be any type of base station (e.g., macro cell base station, micro cell base station, pico cell base station, femto cell base station, . . . ). Further, base station 102 can operate in closed access mode, for example. When employing closed access mode, base station 102 can operate as a Closed Subscriber Group (CSG) base station where a select group of users identified by a CSG Identifier (ID) are allowed to access such base station. It is to be appreciated, however, that the claimed subject matter is not so limited (e.g., base station 102 can operate in hybrid access mode, open access mode, . . . ).

A CSG base station refers to a base station with restricted association accessible by members of a CSG (e.g., non-accessible by non-members of the CSG, . . . ). A CSG base station can also be referred to as a closed base station. A CSG is a set of base stations that share a common access control list of UEs. Further, a CSG base station can advertise a corresponding CSG ID (e.g., CSG identity, . . . ), which specifies the CSG corresponding to the CSG base station.

Base station 102 can broadcast information to UE 116 and UE 122. The broadcasted information, for instance, can include a CSG ID that identifies a CSG associated with base station 102. A CSG ID is a binary based identifier associated with a subscriber group. The CSG ID can be used to identify a subscriber group (e.g., CSG, . . . ) associated with a CSG base station, and can be utilized to support restricted association for a CSG base station. The CSG ID can uniquely identify the CSG associated with the CSG base station; however, the claimed subject matter is not so limited. Further, the CSG ID associated with a base station typically is not based on an Internet Protocol (IP) address. It is also contemplated that more than one base station can share a common CSG ID; however, the claimed subject matter is not so limited.

As a UE (e.g., UE 116, UE 122, . . . ) roams throughout a network, the UE can use a list (e.g., whitelist, . . . ) stored by the UE to identify base stations that the UE is allowed to access. The list retained by the UE can be read only. Further, the read only list can be controlled by an operator. For example, as the network obtains information about which CSGs the UE is allowed to access, a network node (e.g., CSG list server, . . . ) can send a message to the UE instructing the UE to update the read only list. By way of illustration, an application level update can be employed to update the read only list stored by the UE. For example, the application level update can be managed by the operator using over-the-air (OTA) procedures or Open Mobile Alliance Device Management (OMA DM) procedures. Yet, it is to be appreciated that the claimed subject matter is not limited to the foregoing.

The read only list stored by the UE and controlled by the operator can be referred to as an operator CSG list. A problematic scenario can occur when the UE is removed from a CSG when implementing conventional approaches. For example, when the UE is removed from a CSG, and if the operator CSG list of the UE is not updated before the UE attempts to access a CSG cell (e.g., CSG base station, . . . ) from the CSG, then the UE can receive a reject message indicating that the UE lacks authorization for this CSG (e.g., the reject message can indicate cause #25—not authorized for this CSG, . . . ). Since the operator CSG list is read only, the UE can be unable to remove an entry corresponding to the CSG from the operator CSG list, while the UE also can be unable to access the CSG cell (e.g., the UE lacks permission to access the CSG cell, . . . ).

System 100 can mitigate detrimental impact associated with the foregoing problematic scenario oftentimes exhibited in connection with traditional techniques. A UE (e.g., UE 116, UE 122, . . . ) in system 100 can avoid accessing a CSG cell (e.g., CSG base station, . . . ) for which it is not authorized. More particularly, the UE can store CSG entries that have been removed from a CSG subscription in the network, but continue to be included in the operator CSG list retained by the UE. Thus, upon receiving a reject message that indicates that the UE lacks authorization for a CSG with a CSG ID included in the operator CSG list, the UE can store the CSG ID as a forbidden CSG ID of the UE in a set of forbidden CSG Identifiers (IDs) in response. A CSG cell associated with a CSG with a corresponding CSG ID stored as a forbidden CSG ID in the set of forbidden CSG IDs can be considered unsuitable for access by the UE; hence, the UE can refrain from selecting to access such CSG cell while the corresponding CSG ID is included in the set of forbidden CSG IDs.

Figure 2:
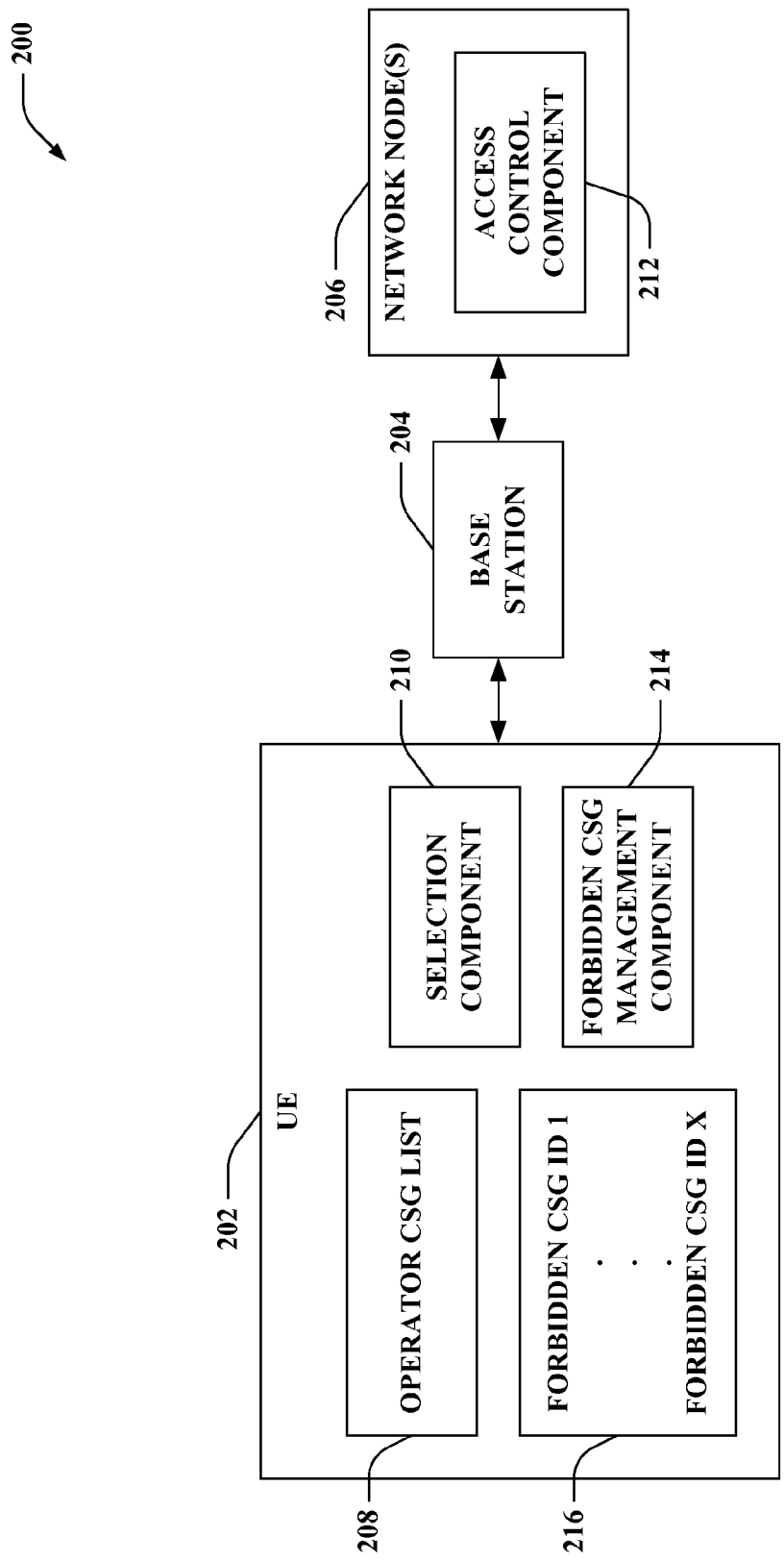
FIG. 2 is an illustration of an example system that supports recovering from lack of synchronization between a network and a UE in a wireless communication environment.

Referring to FIG. 2, illustrated is a system 200 that supports recovering from lack of synchronization between a network and a UE in a wireless communication environment. System 200 includes a UE 202 that can transmit and/or receive information, signals, data, instructions, commands, bits, symbols, and the like. Moreover, although not shown, system 200 can include any number of disparate UE(s), which can be substantially similar to UE 202. UE 202 can communicate with a base station 204 via the forward link and/or reverse link. Base station 204 can transmit and/or receive information, signals, data, instructions, commands, bits, symbols, and the like. Moreover, although not shown, it is contemplated that any number of base stations similar to base station 204 can be included in system 200. Further, it is contemplated that base station 204 can be any type of base station (e.g., femto cell base station, pico cell base station, micro cell base station, macro cell base station, . . . ).

According to an example, base station 204 can be a CSG base station, and thus, can operate in closed access mode. For instance, if base station 204 is a CSG base station, then base station 204 can be associated with a CSG, and the CSG can be identified by a CSG ID. The CSG can be uniquely identified by the CSG ID (e.g., globally, . . . ), for example. According to another example, the CSG can be uniquely identified by the CSG ID in an operator network. Further, base station 204 can advertise the CSG ID. Pursuant to another illustration, disparate base station(s) (not shown) included in system 200 can be CSG base station(s), hybrid base station(s), and/or open base station(s). Thus, system 200 can employ a mixed deployment of base stations where some base stations are hybrid and other base stations are CSG or open. Following this illustration, disparate base station(s) that are CSG base station(s) can be associated with respective CSG(s), and each of the respective CSG(s) can correspond to respective CSG ID(s).

Further, system 200 can include one or more network node(s) 206. For example, a Universal Terrestrial Radio Access Network (UTRAN) architecture for CSG provisioning and access control can be employed. Following this example, network node(s) 206 can include a mobile switching center (MSC)/visitor location register (VLR), a serving General Packet Radio Service (GPRS) support node (SGSN), a gateway GPRS support node (GGSN), a home subscriber server (HSS)/home location register (HLR), a policy and charging rule function (PCRF), and so forth. By way of another example, an Evolved Universal Terrestrial Radio Access Network (E-UTRAN) architecture for CSG provisioning and access control can be utilized. Pursuant to this example, network node(s) 206 can include a packet data network gateway (PGW), a serving gateway (SGW), a mobility management entity (MME), a HSS/HLR, a PCRF, and the like. Moreover, although not shown, system 200 can include CSG provisioning elements such as, for instance, a CSG list server, a CSG administration server, etc. It is to be appreciated, however, that the claimed subject matter is not limited to the foregoing example architectures.

UE 202 can include an operator CSG list 208. Operator CSG list 208 can be stored in UE 202, and can be under exclusive operator control. Operator CSG list 208 can include CSG IDs and/or associated Public Land Mobile Network (PLMN) identities of the CSGs to which a subscriber belongs. Operator CSG list 208, for example, can be stored in a Universal Subscriber Identity Module (USIM) (not shown) (or Subscriber Identity Module (SIM) (not shown)) of UE 202. However, it is further contemplated that operator CSG list 208 can be retained in any other type of memory (not shown) of UE 202. Memory can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the subject systems and methods is intended to comprise, without being limited to, these and any other suitable types of memory.

Operator CSG list 208 can be read only by UE 202. Further, operator CSG list 208 can be provisioned using OMA DM procedures or OTA procedures. For instance, OTA procedures can be utilized to provision operator CSG list 208 if UE 202 has a Release 9 USIM, while OMA DM procedures can be employed to provision operator CSG list 208 if UE 202 has a pre-Release 9 USIM. By way of another illustration, OTA procedures can be used to provision operator CSG list 208 if UE 202 has a Release 8 USIM, while OMA DM procedures can be utilized to provision operator CSG list 208 if UE 202 has a pre-Release 8 USIM. It is to be appreciated, however, that the claimed subject matter is not limited to the foregoing examples.

Further, UE 202 can include a selection component 210 that can automatically select to access a CSG cell (e.g., corresponding to base station 204, . . . ) associated with a CSG with a corresponding CSG ID included in operator CSG list 208 of UE 202. Selection component 210 can implement manual or automatic selection (or reselection). When employing manual CSG selection, selection component 210 can search for available CSG cells (e.g., corresponding to base station 204, corresponding to disparate base station(s) (not shown), . . . ), irrespective of whether the CSG IDs corresponding to the available CSG cells are present or absent in operator CSG list 208. Moreover, selection component 210 can detect a set of available CSG cells that are selectable (e.g., suitable or acceptable for access, . . . ), and can receive input that identifies a manually selected CSG cell chosen to be accessed by UE 202 from the set of available CSG cells.

According to an illustration, when searching for available CSG cell(s), selection component 210 can obtain an advertised CSG ID sent by base station 204 that identifies the CSG corresponding to base station 204 (e.g., as well as advertised CSG ID(s) of one or more disparate base stations, . . . ). Further, selection component 210 can obtain input pertaining to the manually selected CSG cell from the set of available CSG cells. For example, the input can be manually yielded by a user of UE 202. Following this example, selection component 210 can display a list of the available CSG cells in the set for selection (e.g., via a Graphical User Interface (GUI), . . . ), and can receive the input that identifies the manually selected CSG cell in response to the displayed list. Yet, the claimed subject matter is not so limited.

Selection component 210 can cause UE 202 to request to access base station 204 based upon either manual or automatic selection (or reselection). For example, UE 202 can send an attach request message, a detach request message, a tracking area update request message, a location area updating request message, a routing area update request message, or the like upon selecting to access a CSG cell (e.g., base station 204, . . . ) associated with a CSG with a corresponding CSG ID in operator CSG list 208, as effectuated by selection component 210. Further, UE 202 can receive an accept message or a reject message in response to the attach request message, detach request message, tracking area update request message, location area updating request message, routing area update request message, or the like sent thereby.

When UE 202 requests to access base station 204, one or more of network node(s) 206 can evaluate whether UE 202 is authorized to access such base station 204. At least one of the one or more of network node(s) 206 that evaluate whether UE 202 is authorized to access base station 204 can include an access control component 212. By way of example, CSG subscription data can be permanently stored in a HSS/HLR, and retrieved by a MME, MSC/VLR, and/or SGSN for access control during an attach procedure, service request procedure, or tracking/location/routing area updating procedure. When UE 202 accesses a CSG cell (e.g., base station 204, . . . ), access control component 212 of a first one of network node(s) 206 (e.g., MME, SGSN, MSC, . . . ) can check that the CSG ID of the CSG cell corresponds to a CSG ID in the subscription data retrieved from a second one of network node(s) 206 (e.g., HSS/HLR, . . . ), and that an expiration time (if present) remains valid. Further, if the CSG ID is not present in the subscription data or a timer has expired, then access control component 212 of the first one of network node(s) 206 (e.g., MME, SGSN, MSC, . . . ) can send a reject message to UE 202 with an error code indicating that UE 202 is not authorized for this CSG (e.g., error code #25, . . . ). Thus, assuming that base station 204 is associated with a CSG cell, access control component 212 of network node(s) 206 can perform access control based on the CSG ID advertised by the CSG cell (e.g., base station 204, . . . ) and the CSG subscription data of UE 202 stored in the network.

UE 202 can further include a forbidden CSG management component 214 and a set of forbidden CSG IDs 216. When UE 202 (e.g., forbidden CSG management component 214, . . . ) receives a reject message (e.g., error code #25, . . . ) that indicates that UE 202 lacks authorization for the CSG associated with the CSG cell (e.g., base station 204, . . . ), forbidden CSG management component 214 can store the CSG ID corresponding thereto as a forbidden CSG ID of UE 202 in the set of forbidden CSG IDs 216 in response when the CSG ID is included in operator CSG list 208. Forbidden CSG management component 214 can add and remove forbidden CSG IDs from the set of forbidden CSG IDs 216 as described in further detail herein. By way of further example, forbidden CSG management component 214 can store respective PLMN identities associated with CSG cells with the forbidden CSG IDs in the set of forbidden CSG IDs 216.

The set of forbidden CSG IDs 216 can include forbidden CSG ID 1, . . . , and forbidden CSG ID X, where X can be substantially any integer. It is to be appreciated that these CSG IDs can be in the form of a bit string or any other format.

Moreover, although not shown, it is contemplated that the set of forbidden CSG IDs 216 can be an empty set at a given time (e.g., lacking any forbidden CSG IDs, . . . ). It is also appreciated that the set of forbidden CSG IDs 216 can include one forbidden CSG ID at a particular time (e.g., forbidden CSG ID 1, . . . ). According to an example, the set of forbidden CSG IDs 216 can be stored in a forbidden CSG list of UE 202. Following this example, the forbidden CSG list can be a read-write list retained by UE 202. However, it is to be appreciated that the claimed subject matter is not limited to the aforementioned example.

Forbidden CSG management component 214 can temporarily store CSG ID(s) as forbidden CSG ID(s) in the set of forbidden CSG IDs 216, where the CSG ID(s) have been deleted from the CSG subscription data of UE 202 stored in the network, but have yet to be deleted from operator CSG list 208. Thus, the set of forbidden CSG IDs 216 can be leveraged by UE 202 to avoid accessing a CSG cell (e.g., base station 204, . . . ) for which it is not authorized, but which continues to be included in operator CSG list 208.

The set of forbidden CSG IDs 216 can include CSG IDs of CSGs where UE 202 has received reject messages indicating that UE 202 lacks authorization for the CSGs, but which are included in operator CSG list 208. Since operator CSG list 208 is read only on UE 202, forbidden CSG IDs can be stored in the set of forbidden CSG IDs 216 until operator CSG list 208 is updated (e.g., until UE 202 performs a next application level update, . . . ), for example. By way of example, the set of forbidden CSG IDs 216 can be temporarily retained (e.g., in a USIM of UE 202, in memory of UE 202, . . . ); further, the set of forbidden CSG IDs 216 can be deleted by forbidden CSG management component 214 when UE 202 performs an application level update of operator CSG list 208. Yet, it is to be appreciated that the claimed subject matter is not limited to the aforementioned examples, as it is contemplated that forbidden CSG management component 214 can delete the set of forbidden CSG IDs 216 upon UE 202 being switched off, upon removal of a USIM from UE 202, periodically (e.g., 12 hours, 24 hours, 48 hours, substantially any period of time, . . . ), and so forth.

If UE 202 is removed from a CSG or a membership of UE 202 in the CSG expires (e.g., as maintained in the CSG subscription data of UE 202 stored in the network, . . . ) before operator CSG list 208 is updated, then forbidden CSG management component 214 can effectuate the following upon reception of the reject message sent by the network (e.g., yielded by access control component 212, . . . ). If the CSG ID is included in operator CSG list 208, then forbidden CSG management component 214 of UE 202 can add the CSG ID to the set of forbidden CSG IDs 216 (e.g., the forbidden CSG list, . . . ). Moreover, forbidden CSG management component 214 can delete the set of forbidden CSG IDs 216 after UE 202 performs a next successful update of operator CSG list 208 using OTA or OMA DM procedures, for instance. Additionally or alternatively, forbidden CSG management component 214 can delete the set of forbidden CSG IDs 216 upon UE 202 being switched off, upon removal of a USIM of UE 202, periodically, or the like. Further, CSG cells belonging to a CSG ID stored in the set of forbidden CSG IDs 216 can be considered unsuitable for access by UE 202. Hence, the set of forbidden CSG IDs 216 can support the scenario where operator CSG list 208 of UE 202 is out of synch with CSG subscription data of UE 202 stored in the network.

Figure 3:
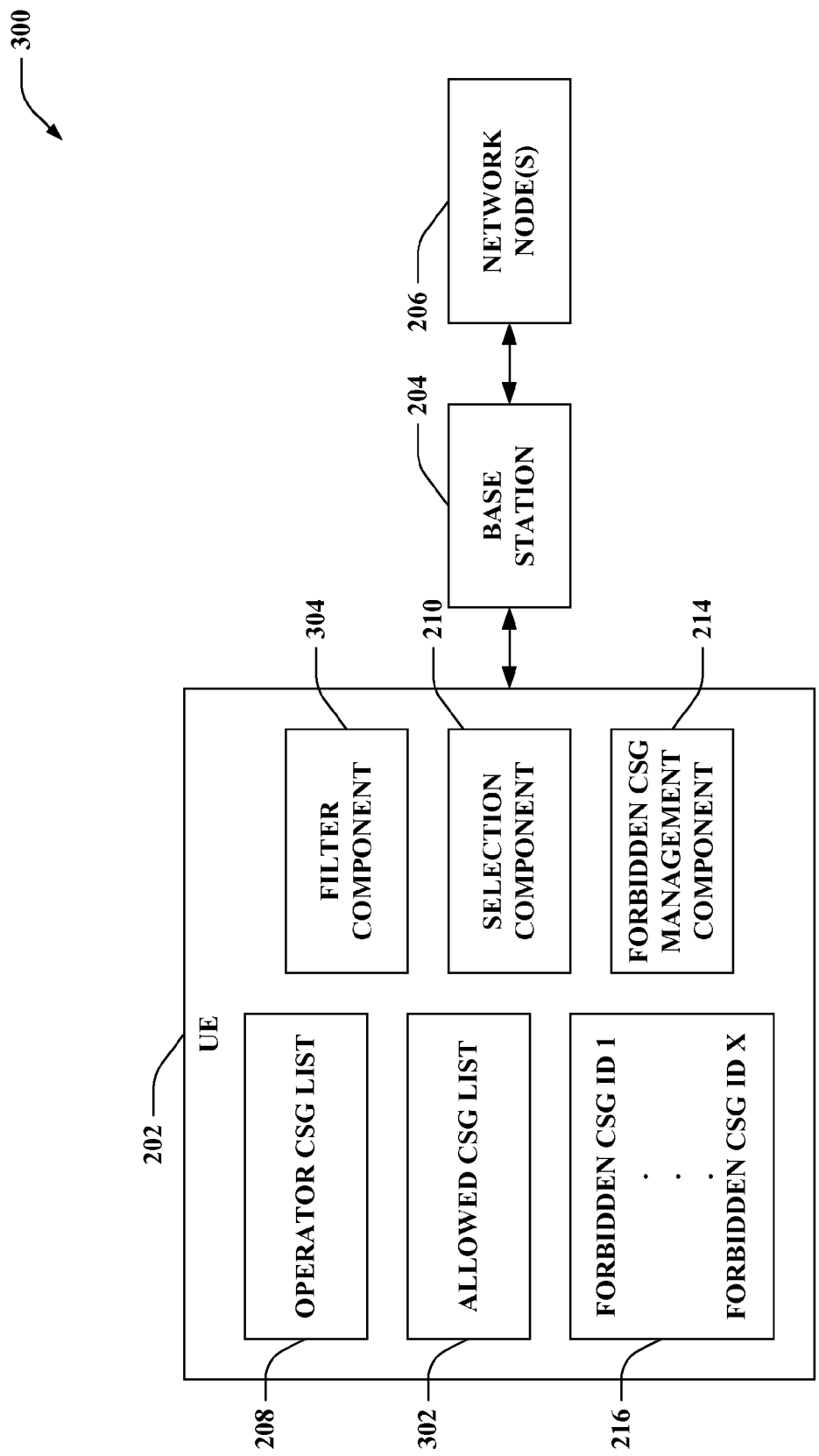
FIG. 3 is an illustration of an example system that identifies CSG cells available for access in a wireless communication environment.

Now referring to FIG. 3, illustrated is a system 300 that identifies CSG cells available for access in a wireless communication environment. System 300 includes UE 202, base station 204, and network node(s) 206. UE 202 can include operator CSG list 208, which can be read only and controlled by an operator, and the set of forbidden CSG IDs 216. Moreover, UE 202 can include selection component 210 and forbidden CSG management component 214.

UE 202 can further include an allowed CSG list 302, which can be updateable by UE 202. For example, when UE 202 performs manual cell selection or some other similar procedure, UE 202 can update allowed CSG list 302 if UE 202 is permitted access to a cell associated with a CSG ID that is not currently present in operator CSG list 208. UE 202 can have read and write permissions for allowed CSG list 302. Moreover, allowed CSG list 302 can be stored on a USIM of UE 202, retained in memory of UE 202, and the like.

According to an example, if an entry (e.g., CSG ID, . . . ) is added to CSG subscription data of UE 202 stored in the network, but has yet to be added to operator CSG list 208 of UE 202, then the entry can be added to allowed CSG list 302 if UE 202 accessed the CSG before operator CSG list 208 has been updated. Moreover, if a CSG ID stored in allowed CSG list 302 occurs in operator CSG list 208 after operator CSG list 208 is updated (e.g., via application level update, . . . ), then UE 202 can remove the corresponding CSG ID in allowed CSG list 302. It is to be appreciated, however, that the claimed subject matter is not limited to the foregoing.

By way of another example, if an entry (e.g., CSG ID, . . . ) is removed from the CSG subscription data of UE 202 stored in the network, then forbidden CSG management component 214 can effectuate the following procedures upon reception of a reject message indicating that UE 202 lacks authorization for the CSG. If the CSG ID is included in allowed CSG list 302, then the entry can be deleted by forbidden CSG management component 214 from allowed CSG list 302. Accordingly, UE 202 can avoid accessing a CSG cell associated with the CSG ID.

Further, UE 202 can include a filter component 304 that can identify CSG cells that are suitable or unsuitable for access by UE 202. For example, filter component 304 can recognize that CSG cells belonging to a CSG ID not included in operator CSG list 208 or allowed CSG list 302 or included in the set of forbidden CSG IDs 216 (e.g., included in a forbidden CSG list, . . . ) as being unsuitable for access by UE 202. Thus, selection component 210 can inhibit automatically selecting (or reselecting) CSG cells deemed unsuitable for access by filter component 304. It is to be appreciated that in the case of manual selection of a CSG cell, selection component 210 can select a CSG cell that is unsuitable for access by UE 202 as determined by filter component 304.

By way of example, filter component 304 can consider a CSG cell (e.g., base station 204, . . . ) associated with a CSG with a corresponding CSG ID stored as a forbidden CSG ID in the set of forbidden CSG IDs 216 as unsuitable for access by UE 202. Further, filter component 304 can consider CSG cells with CSG IDs omitted from operator CSG list 208 and omitted from allowed CSG list 302 as unsuitable for access by UE 202. It is to be appreciated, however, that the claimed subject matter is not so limited.

According to another example, filter component 304 can remove CSG IDs from the set of forbidden CSG IDs 216 from a set of CSG IDs included in operator CSG list 208 to yield a remaining subset of CSG IDs. Following this example, CSG cells associated with CSGs with corresponding CSG IDs included in the remaining subset of CSG IDs can be considered suitable for access by UE 202. Filter component 304 can remove the CSG IDs included in the set of forbidden CSG IDs 216 from the set of CSG IDs included in operator CSG list 208 regardless whether allowed CSG list 302 is employed by UE 202 (e.g., UE 202 can but need not include allowed CSG list 302, . . . ). Yet, it is to be appreciated that the claimed subject matter is not so limited.

Figure 4:
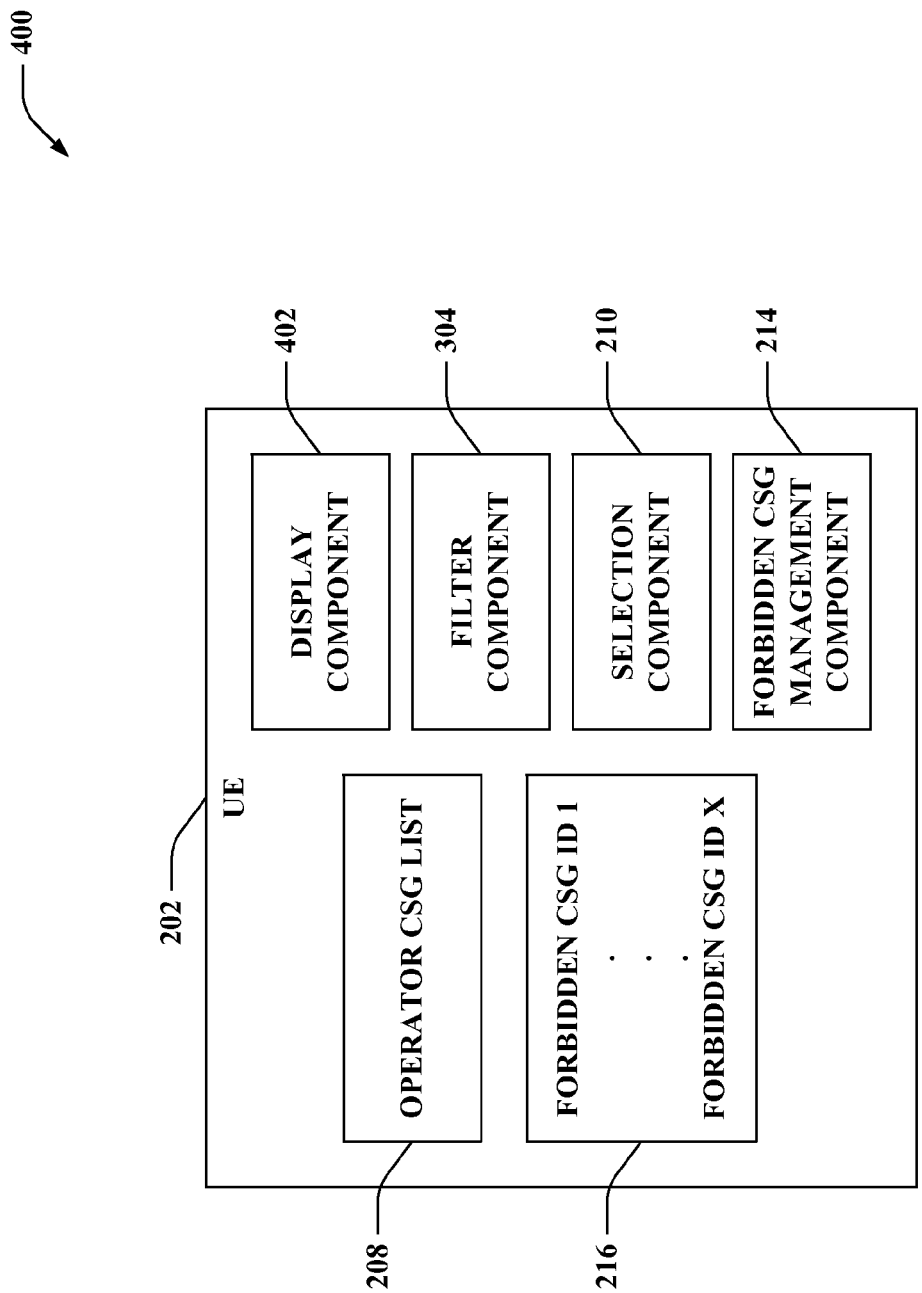
FIG. 4 is an illustration of an example system that performs CSG selection in a wireless communication environment.

Turning to FIG. 4, illustrated is a system 400 that performs CSG selection in a wireless communication environment. System 400 includes UE 202, which can further include operator CSG list 208, selection component 210, forbidden CSG management component 214, the set of forbidden CSG IDs 216, and filter component 304. Moreover, UE 202 can include a display component 402 that can render a list of available CSG IDs and associated PLMN identities. For example, display component 402 can render the list of available CSG IDs and associated PLMN identities via a GUI.

Operator CSG list 208 can include a list of allowed CSG IDs and associated PLMN identities. Further, although not shown, it is contemplated that UE 202 can include an allowed CSG list (e.g., allowed CSG list 302 of FIG. 3, . . . ), which can also include a list of allowed CSG IDs and associated PLMN identities. However, the claimed subject matter is not limited to UE 202 including an allowed CSG list.

Selection component 210 can support automatic CSG selection or manual CSG selection. For example, for automatic CSG selection, a PLMN can be selected by selection component 210. Further, selection component 210, for automatic CSG selection, can cause UE 202 to camp on a cell in the selected PLMN if the cell is either not a CSG cell or if it is a CSG cell with a CSG ID included in operator CSG list 208 (or included in the allowed CSG list of UE 202 if utilized).

By way of another example, for manual CSG selection, display component 402 can indicate a list of available CSG IDs and associated PLMN identities. Further, selection component 210 can obtain input specifying a selection from the list of available CSG IDs and associated PLMN identities. Moreover, selection component 210 can effectuate camping on a cell with the selected CSG ID and attempting to register with a PLMN corresponding to the associated PLMN identity based upon the input.

If a reject message that indicates that UE 202 lacks authorization for a CSG is received by UE 202, then the following can be implemented. Pursuant to an example, if the reject message indicates that UE 202 lacks authorization for a CSG with a corresponding CSG ID present in operator CSG list 208, then filter component 304 can inhibit the CSG ID and associated PLMN identity from being included in a list of allowed CSG IDs and associated PLMN identities provided to an Access Stratum (AS) (e.g., by a Non-Access Stratum (NAS), . . . ). By way of another example, when employing manual CSG selection (e.g., via selection component 210, . . . ), filter component 304 can inhibit display component 402 from displaying the CSG ID and the associated PLMN identity as being in operator CSG list 208 stored by UE 202. Following this example, a CSG ID stored in the set of forbidden CSG IDs 216 (e.g., as controlled by forbidden CSG management component 214, . . . ) can be inhibited (e.g., by filter component 304, . . . ) from being displayed (e.g., by display component 402, . . . ) as included in operator CSG list 208. Thus, displaying (e.g., by display component 402, . . . ) of the CSG ID as being associated with a CSG for which UE 202 is a member can be inhibited by filter component 304 when the CSG ID is stored as a forbidden CSG ID in the set of forbidden CSG IDs 216. According to yet another example, if the allowed CSG list is utilized by UE 202, then the NAS can remove the CSG ID from the allowed CSG list if present; however, it is to be appreciated that the claimed subject matter is not so limited.

For manual CSG selection, filter component 304 can remove CSG ID(s) in the set of forbidden CSG IDs 216 from a set of CSG ID included in operator CSG list 208 to yield a subset of CSG IDs for display as being present in operator CSG list 208 via display component 402. Such removal of CSG ID(s) in the set of forbidden CSG IDs 216 can be effectuated to mitigate user confusion, and thus, enhance user experience. In contrast, if display component 402 indicates that UE 202 is a member of a CSG after UE 202 has been rejected at a CSG cell corresponding to a CSG ID in operator CSG list 208 (e.g., after receipt of a reject message indicating that UE 202 lacks authorization for the CSG, . . . ), then the user can be confused if manual selection is performed again and display component 402 continues to indicate that UE 202 is a member of the CSG corresponding to the CSG ID.

Further, forbidden CSG management component 214 can remove CSG ID(s) from the set of forbidden CSG IDs 216. According to an example, forbidden CSG management component 214 can erase the set of forbidden CSG IDs 216. Following this example, erasing of the set of forbidden CSG IDs 216 can be effectuated by forbidden CSG management component 214 upon switching UE 202 off, upon removal of a USIM from UE 202, periodically, upon operator CSG list 208 being updated, and so forth.

By way of another example, forbidden CSG management component 214 can remove a CSG ID from the set of forbidden CSG IDs 216. Forbidden CSG management component 214 can remove a CSG ID from the set of forbidden CSG IDs 216 if a CSG cell with a forbidden CSG ID is manually selected (e.g., employing selection component 210, . . . ), UE 202 access the CSG cell, and UE 202 receives an accept message in response. Thus, UE 202 is accepted at the CSG cell.

For instance, UE 202 can send an attach request message to a CSG cell corresponding to the CSG ID stored as a forbidden CSG ID in the set of forbidden CSG IDs 216 based upon a manual CSG selection effectuated by selection component 210. UE 202 can receive an attach accept message from the CSG cell in response to the attach request message. Thus, forbidden CSG management component 214 can remove the CSG ID from the set of forbidden CSG IDs in response to receipt of the attach accept message. According to another illustration, UE 202 can send a request message to a CSG cell corresponding to the CSG ID stored as a forbidden CSG ID in the set of forbidden CSG IDs 216 based upon a manual CSG selection effectuated by selection component 210, where the request message can be a tracking area update request message, a location area updating request message, a routing area update request message, or the like. Further, UE 202 can receive an accept message from the CSG cell in response to the request message, where the accept message can be a tracking area update accept message, a location area updating accept message, a routing area update accept message, and so forth. Moreover, forbidden CSG management component 214 can remove the CSG ID from the set of forbidden CSG IDs 216 in response to receipt of the accept message. By way of yet another example, the CSG ID can be removed from the set of forbidden CSG IDs 216 when the CSG ID is removed from operator CSG list 208. It is to be appreciated, however, that the claimed subject matter is not limited to the foregoing examples.

Figure 5:
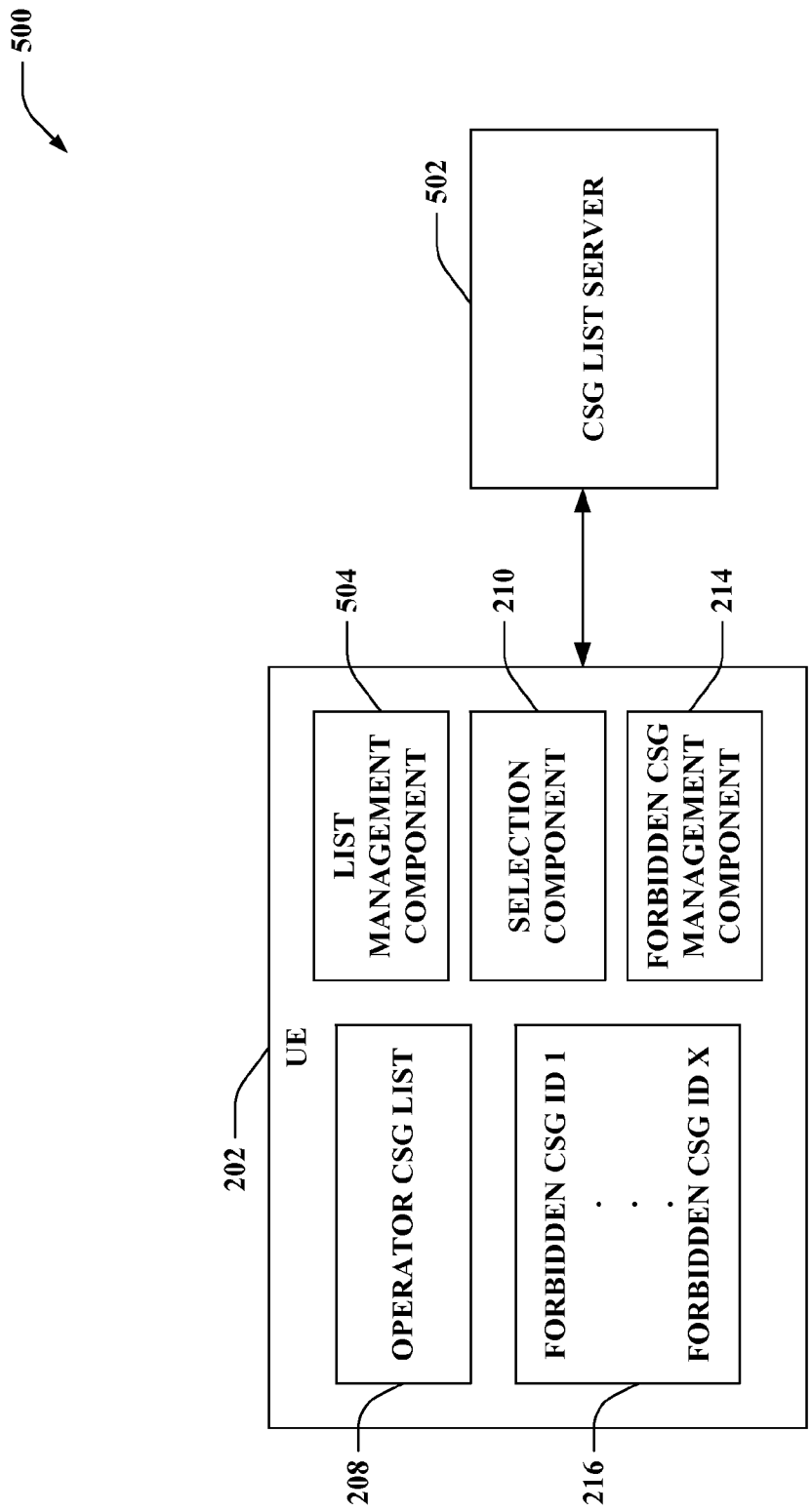
FIG. 5 is an illustration of an example system that provisions an operator CSG list of a UE in a wireless communication environment.

With reference to FIG. 5, illustrated is a system 500 that provisions an operator CSG list (e.g., operator CSG list 208, . . . ) of a UE (e.g., UE 202, . . . ) in a wireless communication environment. System 500 includes UE 202 and a CSG list server 502. UE 202 can further include operator CSG list 208, selection component 210, forbidden CSG management component 214, the set of forbidden CSG IDs 216, and/or a list management component 504.

CSG list server 502 can be employed to provision operator CSG list 208 of UE 202 using OMA DM procedures or OTA procedures. Moreover, CSG list server 502 can update operator CSG list 208 of UE 202. Thus, if a CSG ID is added or removed from CSG subscription data of UE 202 stored in the network, CSG list server 502 can add or remove the CSG ID from operator CSG list 208 of UE 202.

It is to be appreciated, however, that UE 202 can be removed from a CSG before CSG list server 502 updates operator CSG list 208 to delete a CSG ID corresponding to the CSG. According to another illustration, membership of UE 202 to the CSG can expire before CSG list server 502 updates operator CSG list 208 to delete the CSG ID corresponding to the CSG. The foregoing can result in UE 202 receiving a reject message that indicates that UE 202 lacks authorization for the CSG in response to selecting to access a CSG cell associated with the CSG with the corresponding CSG ID included in operator CSG list 208. Thus, forbidden CSG management component 214 can store the CSG ID as a forbidden CSG ID in the set of forbidden CSG IDs 216 in response to receipt of the reject message.

By way of another example, list management component 504 can initiate updating of operator CSG list 208 when at least one forbidden CSG ID is stored (e.g., in the set of forbidden CSG IDs 216, . . . ) by UE 202. For instance, list management component 504 can cause CSG list server 502 to update operator CSG list 208 under such conditions. In accordance with an example, initiating of the update of operator CSG list 208 can be effectuated by list management component 504 at a time of a next access when at least one forbidden CSG ID is stored (e.g., in the set of forbidden CSG IDs 216, . . . ) by UE 202. By way of another example, list management component 504 can initiate the update of operator CSG list 208 after a predetermined length of time during which at least one forbidden CSG ID is stored (e.g., in the set of forbidden CSG IDs 216, . . . ) by UE 202.

Figure 6:
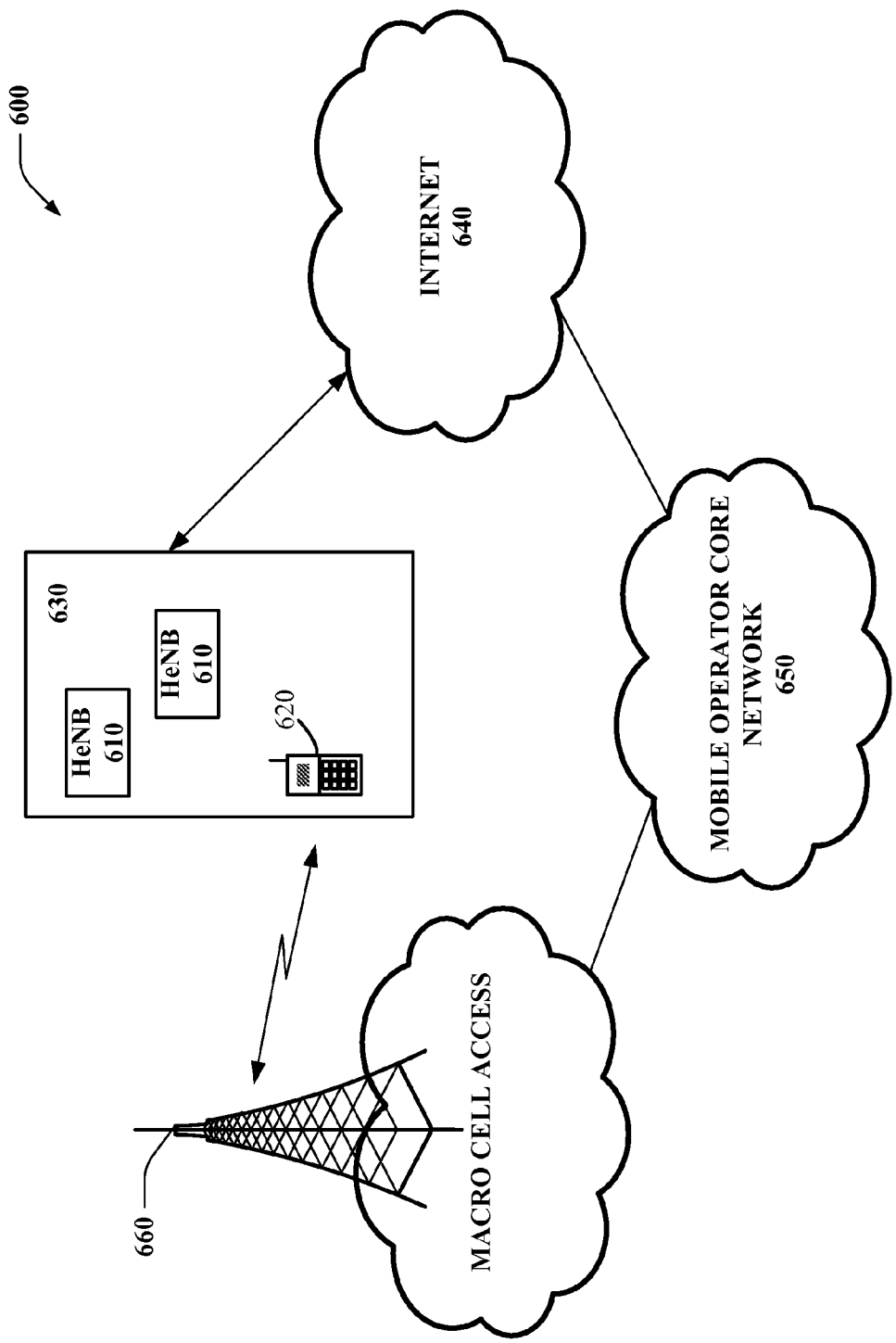
FIG. 6 is an illustration of an example system that enables deployment of access point base stations (e.g., femto cell base stations, . . . ) within a network environment.

FIG. 6 illustrates an exemplary communication system 600 that enables deployment of access point base stations (e.g., femto cell base stations, . . . ) within a network environment. As shown in FIG. 6, system 600 includes multiple femto cell base stations, which can also be referred to as access point base stations, Home Evolved Node B units (HeNBs), Home Node B unit (HNB), femto cells, or the like. The femto cell base stations (HeNBs 610), for example, can each be installed in a corresponding small scale network environment, such as, for example, in one or more user residences 630, and can each be configured to serve associated, as well as alien, UE(s) 620. Each HeNB 610 is further coupled to the Internet 640 and a mobile operator core network 650 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1×RTT, 1×EV-DO Rel0, RevA, RevB) technology and other known and related technologies. In such embodiments described herein, the owner of HeNB 610 can subscribe to mobile service, such as, for example, 3G mobile service, offered through the mobile operator core network 650, and UE 620 can be capable to operate both in a macro cellular environment via a macro cell base station 660 and in a residential small scale network environment. Thus, HeNB 610 can be backward compatible with any existing UE 620. It is contemplated that HeNBs 610 can include CSG HeNB(s), hybrid HeNB(s), and/or open HeNB(s).

Figure 7:
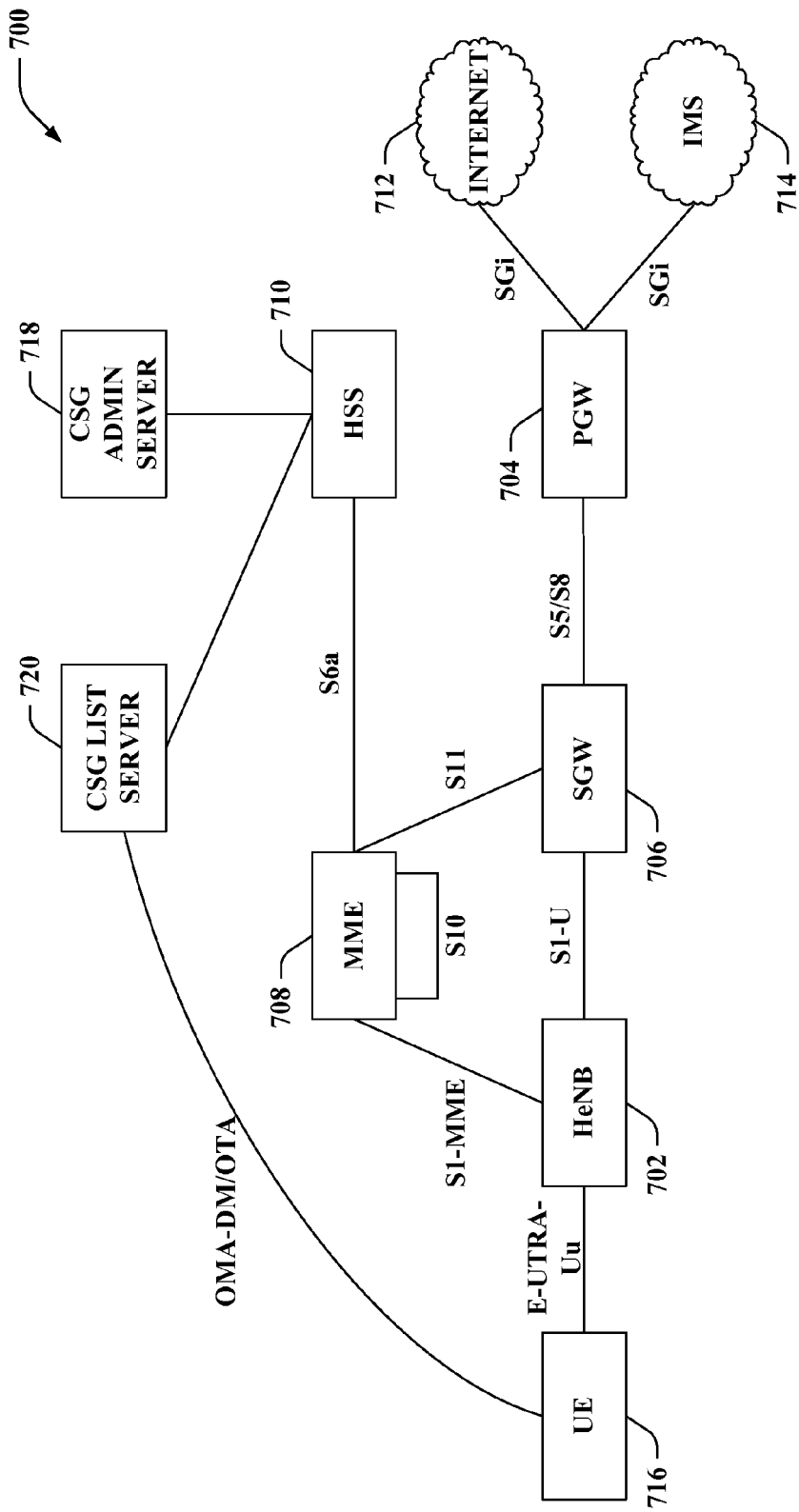
FIG. 7 is an illustration of an example system that provides Closed Subscriber Group (CSG) support in a wireless communication environment.

Now referring to FIG. 7, illustrated is an example system 700 that provides Closed Subscriber Group (CSG) support in a wireless communication environment. System 700 depicts an example architecture model that can be utilized in conjunction with an HeNB 702 (e.g., HeNBs 610 of FIG. 6, base station 204 of FIG. 2, . . . ). It is contemplated, however, that disparate architecture models are intended to fall within the scope of the hereto appended claims. For instance, although not shown, it is contemplated that differing architectures that support utilization of CSGs with a HNB, a macro cell base station, or any other type of base station is intended to fall within the scope of the claimed subject matter.

According to an illustration, HeNB 702 can be located on a user's premises; however, the claimed subject matter is not so limited. HeNB 702 can provide E-UTRAN eNB functions as well as functions to support HeNB authentication, HeNB registration, and HeNB configuration through Operation and Maintenance (OAM).

HeNB 702 can communicate directly or indirectly with various nodes (e.g., network node(s) 206 of FIG. 2, . . . ) of a core network (e.g., Evolved Packet Core (EPC), . . . ) in system 700. For instance, the nodes of the core network can include a PGW 704, a SGW 706, a MME 708, and a HSS 710. Although not shown, it is contemplated that system 700 can include more than one PGW 704, SGW 706, MME 708, and/or HSS 710.

PGW 704 can interface with external Packet Data Network(s) (PDN(s)) such as, for instance, the Internet 712 and/or an IP multimedia subsystem (IMS) 714. Moreover, although not depicted, PGW 704 can additionally or alternatively interface with an Intranet or any disparate PDN(s). PGW 704, for example, can handle address allocation, policy enforcement, packet classification and routing, and so forth.

SGW 706 is associated with a user plane and is an anchor point for mobility. SGW 706 points to a serving base station (e.g., HeNB 702, disparate HeNB, differing eNB, . . . ) of a user (e.g., employing a UE 716, . . . ). Thus, upon handing off to a differing base station, SGW 706 can repoint to the differing base station. Further, SGW 706 can enable data to be routed to the appropriate base station (e.g., HeNB 702, . . . ) serving UE 716 at a given time.

MME 708 is associated with a control plane. MME 708 can support control plane signaling for mobility, Quality of Service (QoS) initialization, user authentication, and the like. Further, HSS 710 can store various subscription information such as, for instance, phone numbers, profiles, and the like.

System 700 includes various interfaces between nodes. For instance, an S6a interface can connect MME 708 and HSS 710 and an S5/S8 interface can connect SGW 706 and PGW 704. Further, an S1-U interface can connect HeNB 702 and SGW 706, an S11 interface can couple SGW 706 and MME 708, and an S1-MME interface can connect HeNB 702 and MME 708. Additionally, PGW 704 can connect to PDN(s) (e.g., Internet 712, IMS 714, . . . ) via respective SGi interfaces, and HeNB 702 and UE 716 can be coupled via an E-UTRA-Uu interface. Moreover, MME 708 can be associated with an S10 interface to another MME (not shown).

HSS 710 can also directly or indirectly connect to CSG provisioning network elements, namely a CSG administration server 718 and a CSG list server 720 (e.g., CSG list server 502 of FIG. 5, . . . ). CSG administration server 718 can support CSG administration functions, which can be utilized to manage a list of subscribers for a CSG (e.g., access control list for the CSG, . . . ). For example, an owner of HeNB 702 can interact with CSG administration server 718 via an interface (e.g., GUI, website, . . . ) to add or remove a user from being included in a CSG associated with HeNB 702. Based upon such changes, CSG administration server 718 can update HSS 710 to adjust subscription information for the user as modified.

Further, CSG list server 720 provides UE CSG provisioning functionality utilized to manage a whitelist (WL) (e.g., operator CSG list 208 of FIG. 2, allowed CSG list 302 of FIG. 3, . . . ) for UE 716 (and/or any disparate UE(s) (not shown)). CSG list server 720 can inform UE 716 that it is a member of a particular group (e.g., particular CSG, . . . ). Further, when a subscription is updated by CSG administration server 718, HSS 710 can store subscription information corresponding to the update. Moreover, updating the subscription information in HSS 710 can trigger a message to be transferred to CSG list server 720, which can cause CSG list server 720 to utilize an OMA-DM process or OTA process to downlink the modified subscription information to UE 716. Hence, CSG list server 720 can enable coordinating the subscription information retained by HSS 710 and UE 716 (e.g., stored in memory of UE 716, retained on a Subscriber Identity Module (SIM) or a USIM associated with UE 716, . . . ).

Various logical network protocol functions between UE 716 and core network elements can be effectuated in system 700 to support CSG. The logical network protocol functions, for instance, can include UE CSG provisioning functions, access control functions, mobility management functions, and CSG administration functions.

UE CSG provisioning functions can manage the whitelist for UE 716. The whitelist is a list of CSG IDs; UE 716 is able to access CSG cells that have a CSG ID included in the whitelist. The whitelist can be stored in the network in order to perform access control and stored by UE 716 to enable selecting a cell to be accessed. The whitelist in the network can be permanently stored in HSS 710, and retrieved by MME 708 for access control during attach, detach, service request, and tracking area updating procedures. The whitelist at UE 716 can be stored on a USIM for such UE 716 or memory of UE 716.

Access control functions can ensure that a UE has a valid subscription at a CSG where it performs an access. MME 708 (e.g., access control component 212 of FIG. 2, . . . ) can perform access control for UE 716 accessing the network through an CSG cell during attach, detach, service request, and tracking area updating procedures. Further, MME 708 can include a reject cause value in a Non-Access Stratum (NAS) signaling response upon recognizing that UE 716 is not allowed in the CSG for attach, service request, and/or tracking area updating procedures.

Further, mobility management functions can be used to keep track of a current location of UE 716. The location of UE 716 in idle state can be known by the network on a Tracking Area list granularity. Thus, when in idle state, UE 716 can be paged in all cells of the Tracking Area list received at a last Tracking Area Update.

Moreover, CSG administration functions can manage the list of subscribers for a CSG. The CSG administration function can be hosted by an operator or a third party. For instance, a single list can control the HeNBs for a CSG. Further, HeNBs advertising the same CSG ID can have a single list of subscribers.

As noted above, HSS 710 can permanently retain CSG subscription information. Further, the CSG subscription information can be retrieved by MME 708 during an attach procedure or tracking area updating procedure as part of a subscription profile of UE 716. MME 708 can utilize the retrieved CSG subscription information to perform access control. For instance, MME 708 can perform access control since access control is a NAS level procedure, and MME 708 is the NAS endpoint in the core network. Further, MME 708 can obtain and store a copy of a whitelist for UE 716 (e.g., the whitelist can be retained as part of the user's subscription information, . . . ). Moreover, MME 708 can know a CSG ID of a CSG cell where UE 716 is performing the access in order to effectuate access control.

Although described herein as being performed at the NAS, it is contemplated that access control for CSGs can be implemented at an Access Stratum (AS). Access control at the AS can be implemented in a Radio Network Controller (RNC) function in HeNB 702 (or in a related function in an HeNB-Gateway (not shown)). It is to be appreciated, however, that the claimed subject matter is not so limited.

Figure 8:
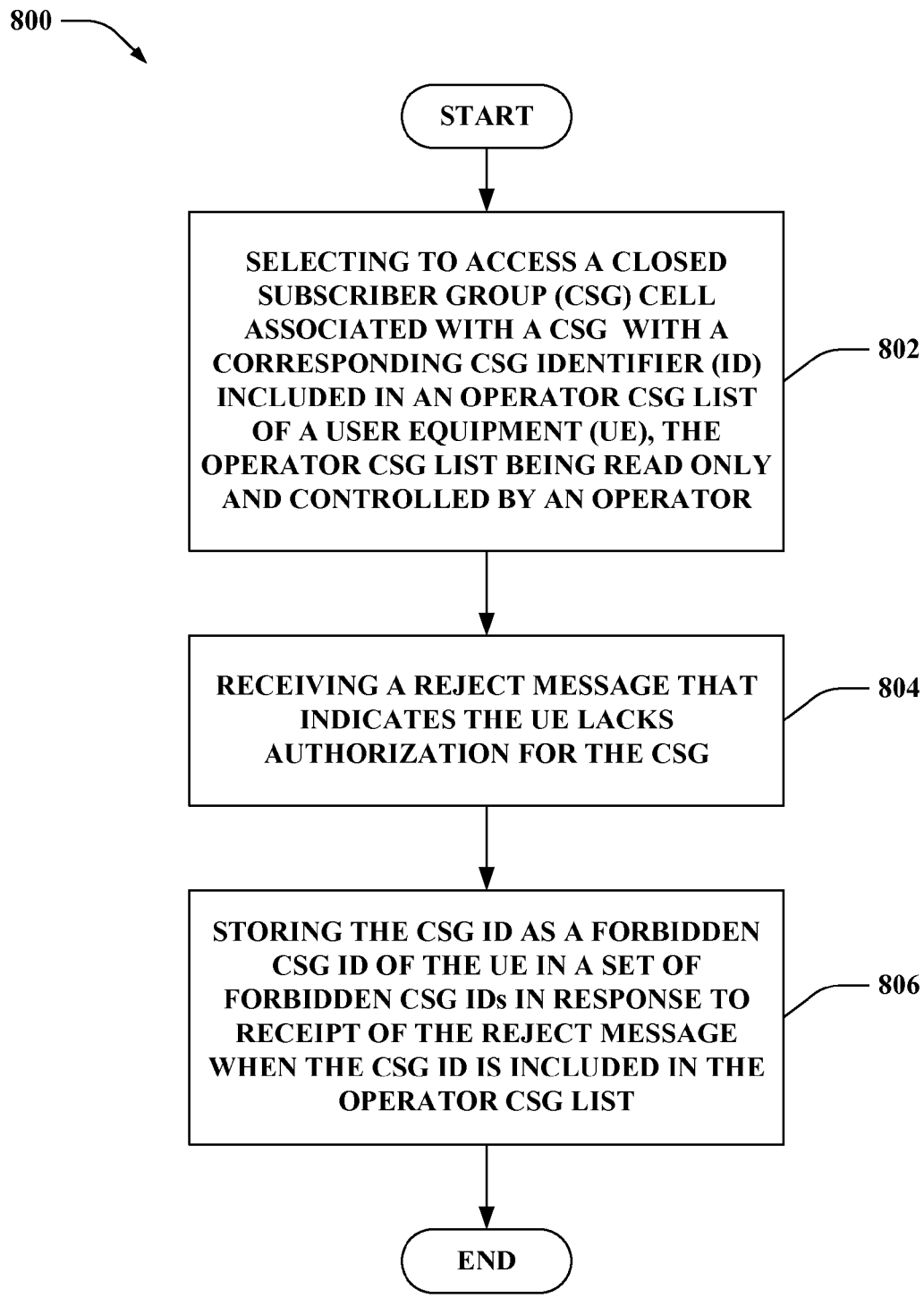
FIG. 8 is an illustration of an example methodology that facilitates recovering from lack of synchronization in a wireless communication environment.
Figure 9:
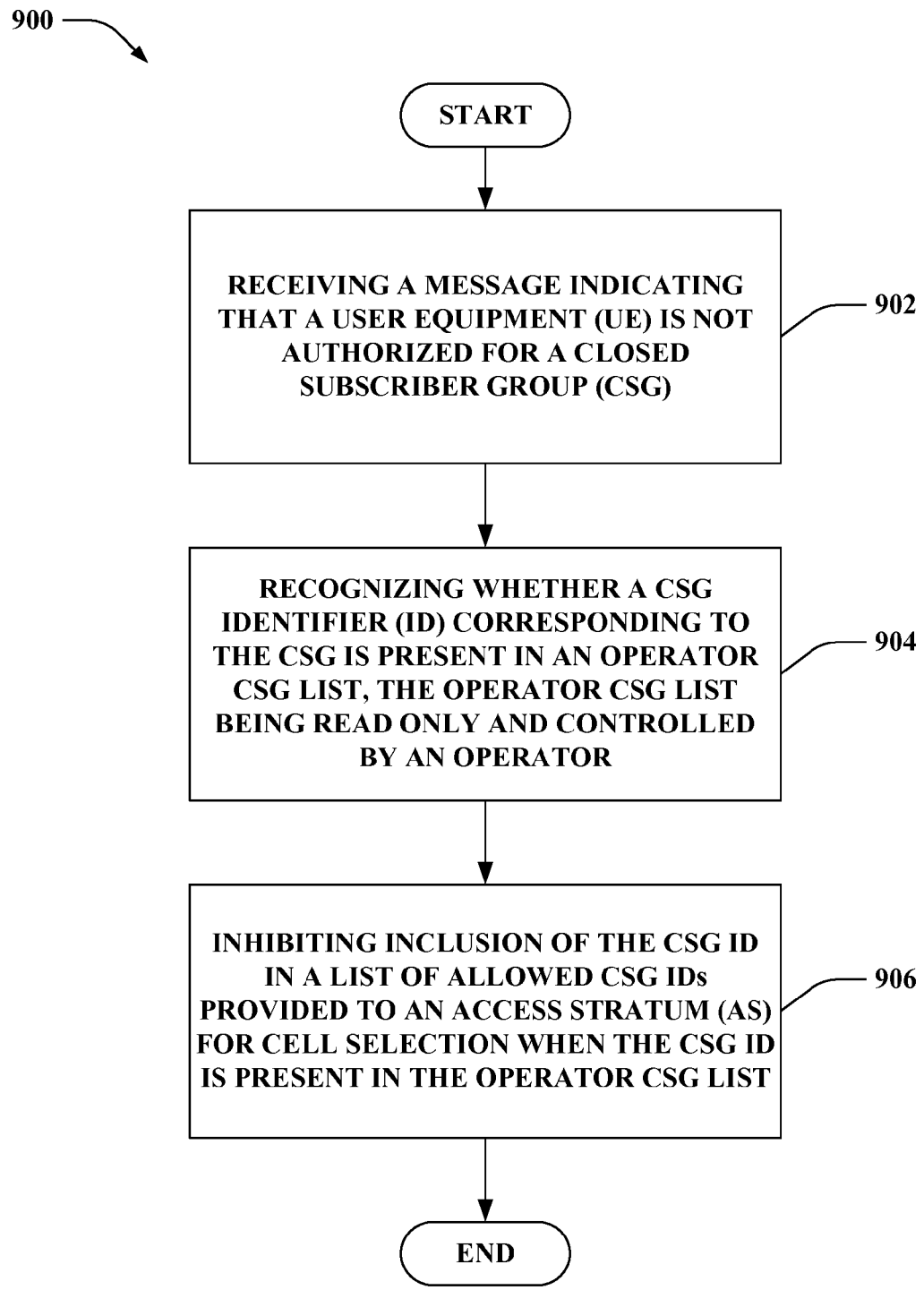
FIG. 9 is an illustration of an example methodology that facilitates identifying suitable cells for access in a wireless communication environment.
Figure 10:
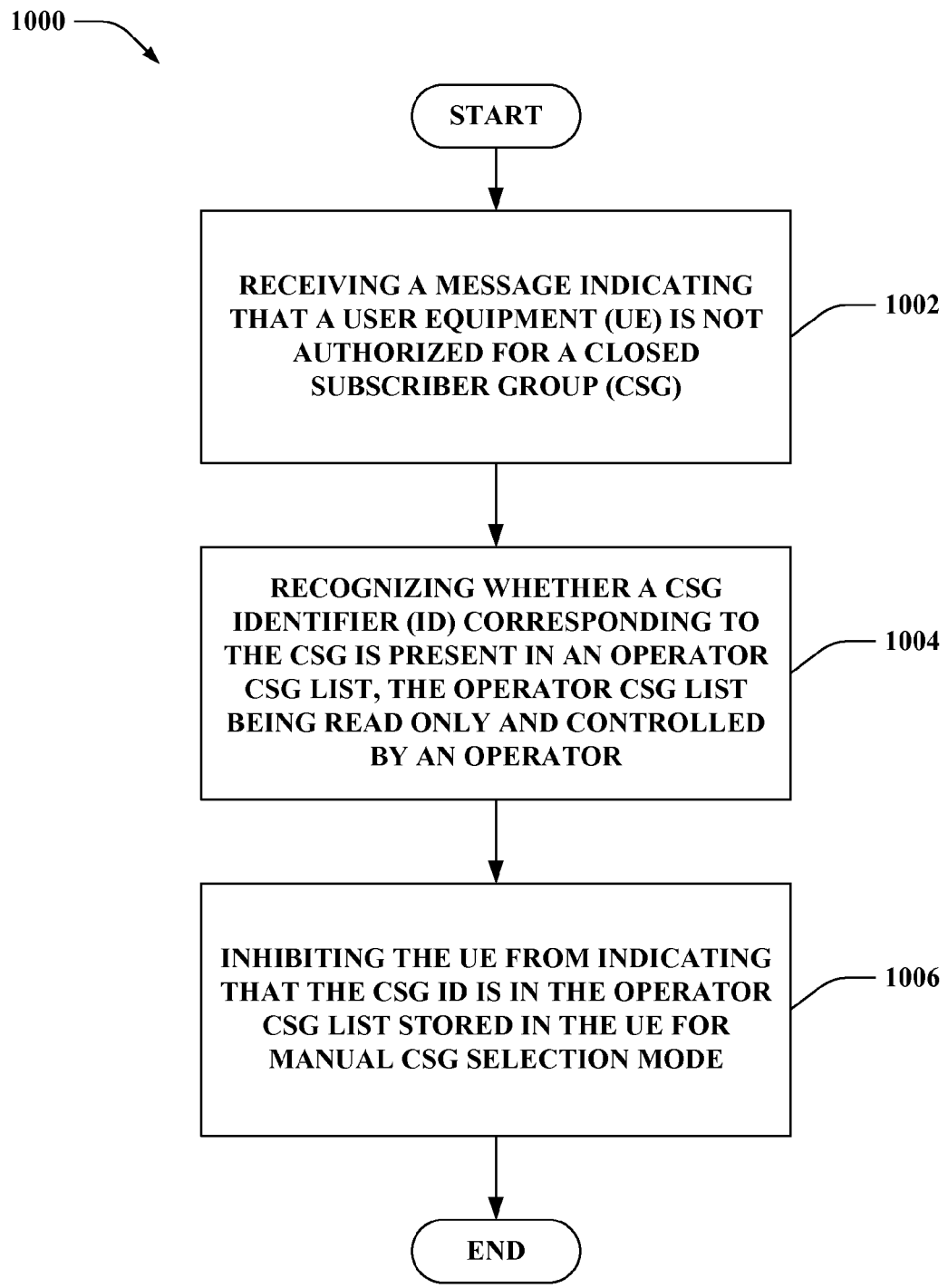
FIG. 10 is an illustration of an example methodology that facilitates displaying entries in an operator CSG list for manual CSG selection mode in a wireless communication environment.

Referring to FIGS. 8-10, methodologies relating to managing access control to CSGs in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 8, illustrated is a methodology 800 that facilitates recovering from lack of synchronization in a wireless communication environment. At 802, selecting to access a Closed Subscriber Group (CSG) cell associated with a CSG with a corresponding CSG Identifier (ID) included in an operator CSG list of a user equipment (UE) can be effectuated. Further, the operator CSG list can be read only and controlled by an operator. For instance, an attach request message, a detach request message, a tracking area update request message, a location area updating request message, a routing area update request message, or the like can be sent upon selecting to access the CSG cell associated with the CSG with the corresponding CSG ID included in the operator CSG list. At 804, a reject message that indicates the UE lacks authorization for the CSG can be received. At 806, the CSG ID can be stored as a forbidden CSG ID of the UE in a set of forbidden CSG IDs in response to receipt of the reject message when the CSG ID is included in the operator CSG list. Further, the forbidden CSG ID can be stored in a forbidden CSG list of the UE. Moreover, a Public Land Mobile Network (PLMN) identity associated with the CSG cell can be stored with the forbidden CSG ID.

According to an example, the UE can be removed from the CSG before the operator CSG list is updated to delete the CSG ID. By way of another example, a membership of the UE for the CSG can expire before the operator CSG list is updated to delete the CSG ID.

CSG cells can be recognized as being suitable or unsuitable for access by the UE as a function of at least the operator CSG list and the set of forbidden CSG IDs. For instance, a given CSG cell associated with a given CSG with a corresponding CSG ID stored as a given forbidden CSG ID in the set of forbidden CSG IDs can be considered unsuitable for access by the UE. According to another illustration, the set of forbidden CSG IDs can be removed from a set of CSG IDs included in the operator CSG list to yield a remaining subset of CSG IDs, wherein CSG cells associated with CSGs with corresponding CSG IDs included in the remaining subset of CSG IDs can be considered suitable for access by the UE. Moreover, CSG cells with forbidden CSG IDs can be considered unsuitable for access by the UE. In accordance with another example, CSG cells with CSG IDs omitted from the operator CSG list and omitted from an allowed CSG list of the UE can be considered unsuitable for access by the UE, where the UE can have read and write permissions for the allowed CSG list.

According to another example, an update of the operator CSG list can be initiated when at least one forbidden CSG ID is stored (e.g., in the set of forbidden CSG IDs, . . . ). For instance, the update of the operator CSG list can be initiated at a time of a next access when the at least one forbidden CSG ID is stored. In accordance with another illustration, the update of the operator CSG list can be initiated after a predetermined length of time during which the at least one forbidden CSG ID is stored. It is to be appreciated, however, that the claimed subject matter is not limited to the foregoing examples.

By way of another example, the set of forbidden CSG IDs can be erased. Following this example, the set of forbidden CSG IDs can be erased upon switching off the UE, upon removal of a Universal Subscriber Identity Module (USIM) from the UE, periodically, upon the operator CSG list being updated, and the like. For instance, the operator CSG list can be updated by a network (e.g., CSG list server, . . . ) via OMA DM procedures or OTA procedures.

In accordance with another example, the CSG ID (or similarly any disparate CSG ID) can be removed from the set of forbidden CSG IDs. The CSG ID can be removed from the set of forbidden CSG IDs when implementing manual CSG selection. For example, an attach request message can be sent to the CSG cell corresponding to the CSG ID stored as the forbidden CSG ID based upon a manual CSG selection. Further, an attach accept message can be received from the CSG cell in response to the attach request message. Moreover, the CSG ID can be removed from the set of forbidden CSG IDs in response to receipt of the attach accept message. By way of another example, a request message can be sent to the CSG cell corresponding to the CSG ID stored as the forbidden CSG ID based upon a manual CSG selection, wherein the request message can be a tracking area update request message, a location area updating request message, and/or a routing area update request message. Following this example, an accept message can be received from the CSG cell in response to the request message, wherein the accept message can be a tracking area update accept message, a location area updating accept message, and/or a routing area update accept message. Further, the CSG ID can be removed from the set of forbidden CSG IDs in response to receipt of the accept message. According to yet another example, the CSG ID can be removed from the set of forbidden CSG IDs when the CSG ID is removed from the operator CSG list. It is to be appreciated, however, that the claimed subject matter is not limited to the foregoing examples.

Further, inclusion of the CSG ID in a list of allowed CSG identities provided to an Access Stratum (AS) for cell selection can be inhibited in response to receipt of the reject message when the CSG ID is included in the operator CSG list, for example. According to another illustration, display of the CSG ID as being in the operator CSG list can be inhibited for manual CSG selection mode upon the CSG ID being stored as the forbidden CSG ID. By way of yet another example, display of the CSG ID as being associated with a CSG for which the UE is a member can be inhibited when the CSG ID is stored as the forbidden CSG ID.

Now referring to FIG. 9, illustrated is a methodology 900 that facilitates identifying suitable cells for access in a wireless communication environment. At 902, a message indicating that a user equipment (UE) is not authorized for a Closed Subscriber Group (CSG) can be received. For instance, the message can be received in response to accessing a CSG cell associated with the CSG. At 904, whether a CSG Identifier (ID) corresponding to the CSG is present in an operator CSG list can be recognized. Further, the operator CSG list can be read only and controlled by an operator. At 906, inclusion of the CSG ID in a list of allowed CSG IDs provided to an Access Stratum (AS) for cell selection can be inhibited when the CSG ID is present in the operator CSG list. Further, the list of allowed CSG IDs can be provided to the AS by a Non-Access Stratum (NAS). By way of another example, the CSG ID can be inhibited from being included in the list of allowed CSG IDs for a period of time, until the UE is switched off, until a Universal Subscriber Identity Module (USIM) is removed from the UE, until the operator CSG list is updated, and so forth.

Turning to FIG. 10, illustrated is a methodology 1000 that facilitates displaying entries in an operator CSG list for manual CSG selection mode in a wireless communication environment. At 1002, a message indicating that a user equipment (UE) is not authorized for a Closed Subscriber Group (CSG) can be received. For instance, the message can be received in response to accessing a CSG cell associated with the CSG. At 1004, whether a CSG Identifier (ID) corresponding to the CSG is present in an operator CSG list can be recognized. Further, the operator CSG list can be read only and controlled by an operator. At 1006, the UE can be inhibited from indicating that the CSG ID is in the operator CSG list stored in the UE for manual CSG selection mode. According to a further example, the UE can be inhibited from indicating (e.g., inhibiting display thereof, . . . ) that the CSG ID is in the operator CSG list stored in the UE for a period of time, until the UE is switched off, until a Universal Subscriber Identity Module (USIM) is removed from the UE, until the operator CSG list is updated, and so forth.

It will be appreciated that, in accordance with one or more aspects described herein, inferences can be made regarding effectuating management of access control to CSGs in a wireless communication environment that supports multiple access modes. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
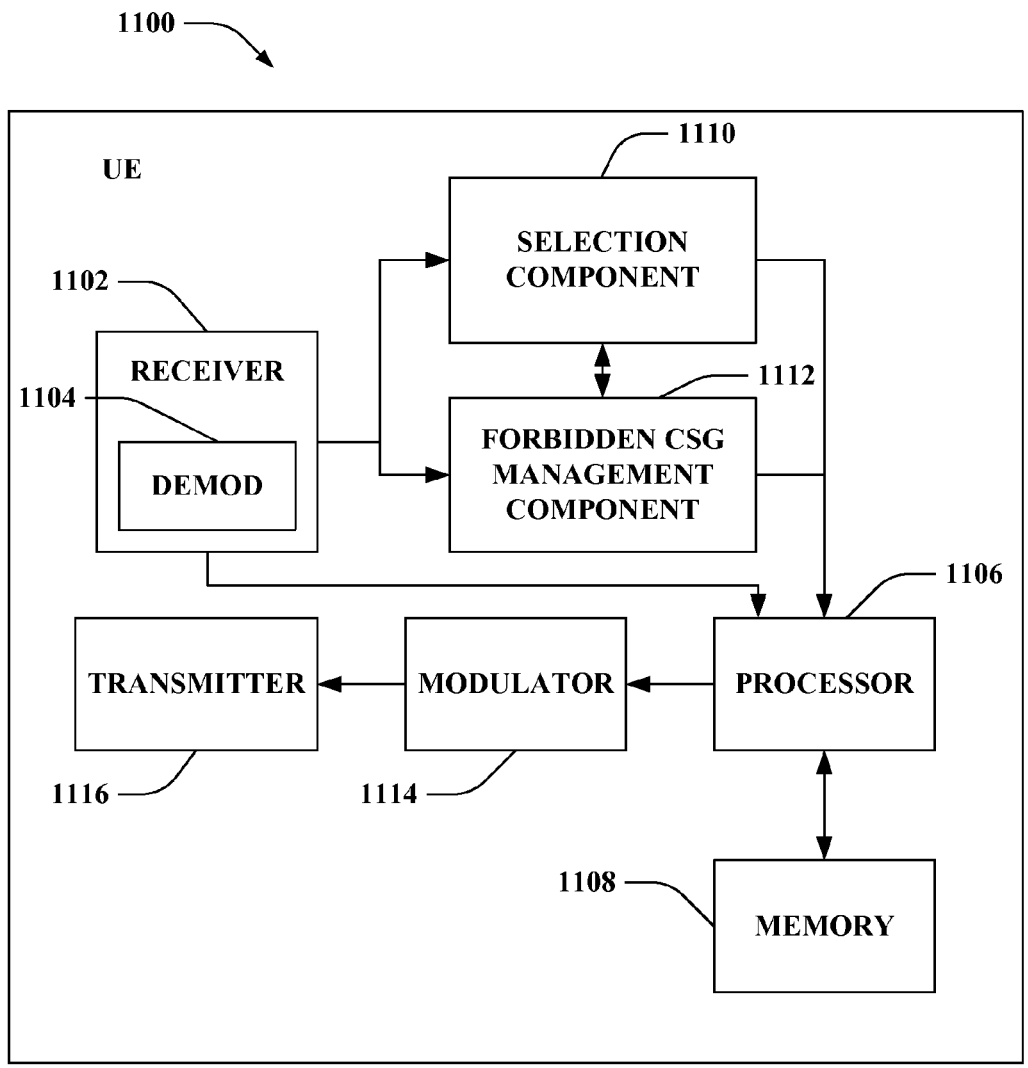
FIG. 11 is an illustration of an example UE that manages access control to CSGs in a wireless communication system.

FIG. 11 is an illustration of a UE 1100 that manages access control to CSGs in a wireless communication system. UE 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. According to an example, receiver 1102 can obtain an advertised CSG ID that identifies a CSG corresponding to a base station. Processor 1106 can be a processor dedicated to analyzing information received by receiver 1102 and/or generating information for transmission by a transmitter 1116, a processor that controls one or more components of UE 1100, and/or a processor that both analyzes information received by receiver 1102, generates information for transmission by transmitter 1116, and controls one or more components of UE 1100.

UE 1100 can additionally comprise memory 1108 that is operatively coupled to processor 1106 and that can store data to be transmitted, received data, and any other suitable information related to performing the various actions and functions set forth herein. Memory 1108, for instance, can store protocols and/or algorithms associated with analyzing obtained CSG IDs. Further, memory 1108 can store protocols and/or algorithms associated with selecting a base station (e.g., via manual or automatic CSG selection, . . . ) to access from an operator CSG list, detecting a reject message that indicates that UE 1100 lacks authorization for the CSG, and storing a CSG ID as a forbidden CSG of UE 1100 in a set of forbidden CSG IDs in response to receipt of the reject message when the CSG ID is included in the operator CSG list. Memory 1108 can also include an operator CSG list (e.g., operator CSG list 208 of FIG. 2, . . . ), which can be read only and controlled by an operator, and a set of forbidden CSG IDs (e.g., set of forbidden CSG IDs 216 of FIG. 2, . . . ). It is further contemplated that memory 1108 can also include an allowed CSG list (e.g., allowed CSG list 302 of FIG. 3, . . . ), where UE 1100 can have read and write permissions to the allowed CSG list; yet, it is to be appreciated that the claimed subject matter is not so limited.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1106 can be operatively coupled to a selection component 1110 and/or a forbidden CSG management component 1112. Selection component 1110 can be substantially similar to selection component 210 of FIG. 2 and/or forbidden CSG management component 1112 can be substantially similar to forbidden CSG management component 214 of FIG. 2. Selection component 1110 can select to access a CSG cell associated with a CSG with a corresponding CSG ID included in an operator CSG list (e.g., retained in memory 1108, . . . ). Further, UE 1100 (e.g., receiver 1102, . . . ) can receive a reject message that indicates that UE 1100 lacks authorization for the CSG. Moreover, forbidden CSG management component 1112 can store the CSG ID as a forbidden CSG ID in a set of forbidden CSG IDs in response to receipt of the reject message when the CSG ID is included in the operator CSG list. Although not shown, it is to be appreciated that UE 1100 can further include a filter component (e.g., substantially similar to filter component 304 of FIG. 3, . . . ), a display component (e.g., substantially similar to display component 402 of FIG. 4, . . . ), and/or a list management component (e.g., substantially similar to list management component 504 of FIG. 5, . . . ). UE 1100 still further comprises a modulator 1114 and a transmitter 1116 that transmits data, signals, etc. to a base station. Although depicted as being separate from the processor 1106, it is to be appreciated that selection component 1110, forbidden CSG management component 1112 and/or modulator 1114 can be part of processor 1106 or a number of processors (not shown).

Figure 12:
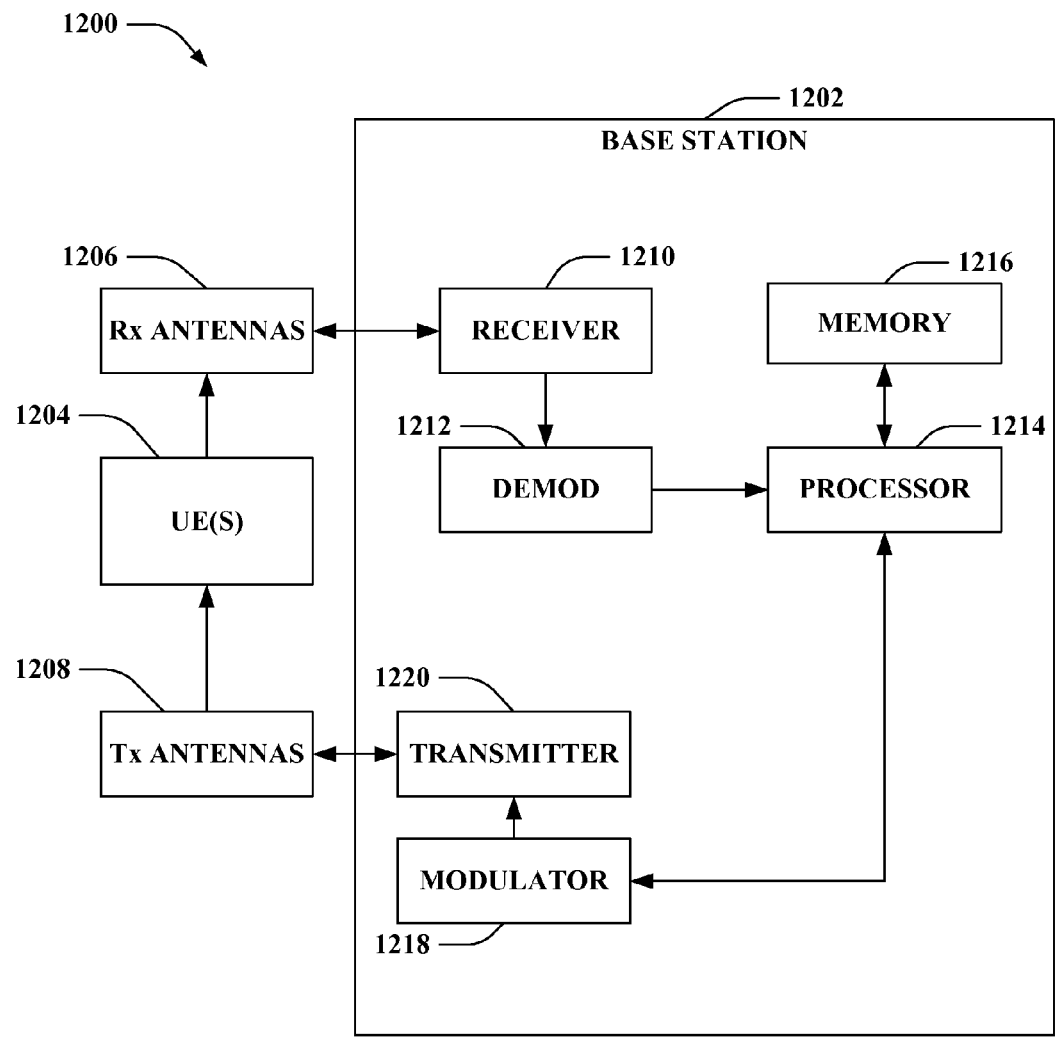
FIG. 12 is an illustration of an example system that supports access in a wireless communication environment.

FIG. 12 is an illustration of a system 1200 that supports access in a wireless communication environment. System 1200 comprises a base station 1202 (e.g., access point, . . . ) with a receiver 1210 that receives signal(s) from one or more UEs 1204 through a plurality of receive antennas 1206, and a transmitter 1220 that transmits to the one or more UEs 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from UE(s) 1204 and/or any other suitable information related to performing the various actions and functions set forth herein. Base station 1202 can further include a modulator 1218. Modulator 1218 can multiplex a frame for transmission by a transmitter 1220 through antennas 1208 to UE(s) 1204 in accordance with the aforementioned description. Although depicted as being separate from the processor 1214, it is to be appreciated that modulator 1218 can be part of processor 1214 or a number of processors (not shown).

Figure 13:
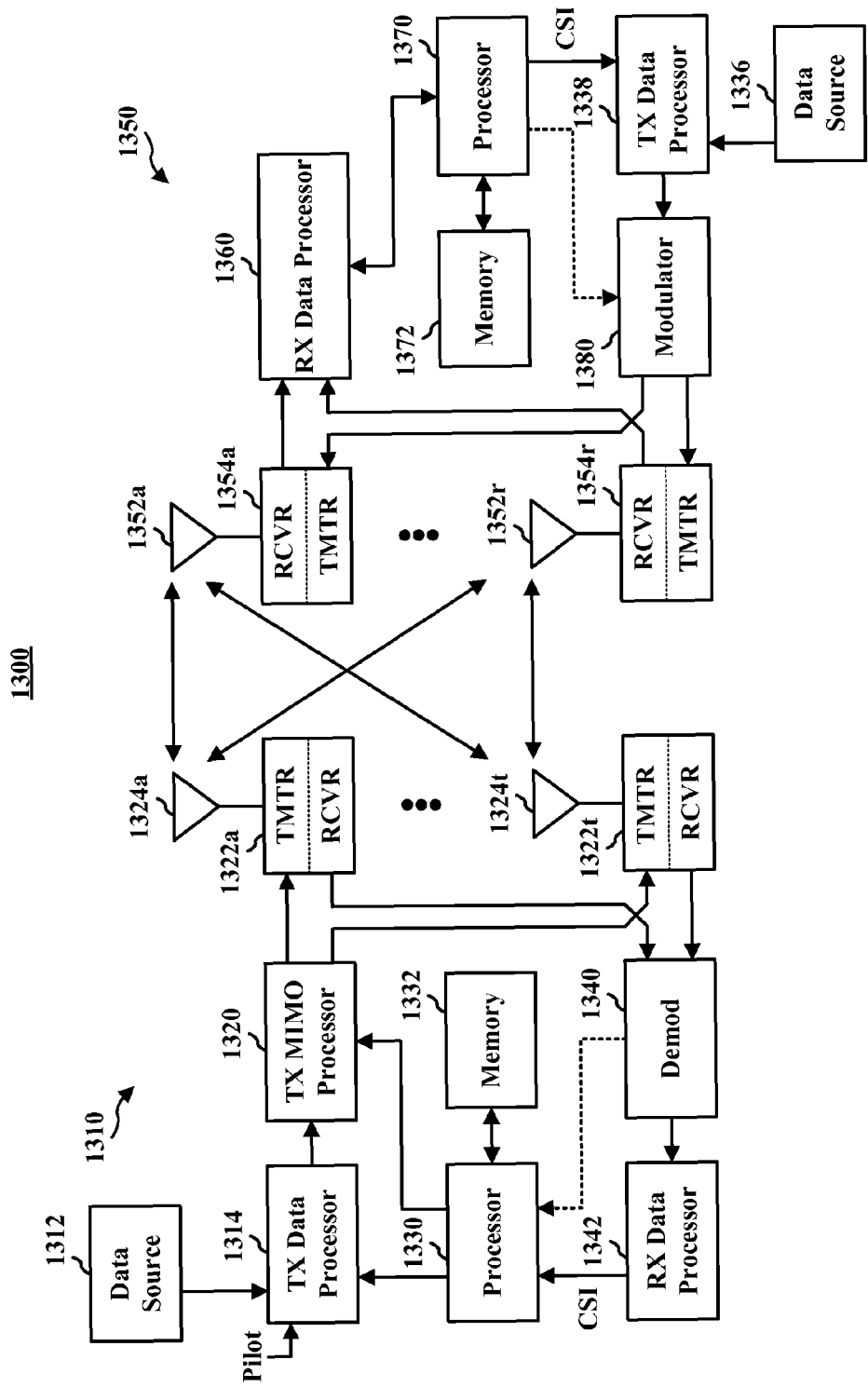
FIG. 13 is an illustration of an example wireless network environment that can be employed in conjunction with the various systems and methods described herein.

FIG. 13 shows an example wireless communication system 1300. The wireless communication system 1300 depicts one base station 1310 and one UE 1350 for sake of brevity. However, it is to be appreciated that system 1300 can include more than one base station and/or more than one UE, wherein additional base stations and/or UEs can be substantially similar or different from example base station 1310 and UE 1350 described below. In addition, it is to be appreciated that base station 1310 and/or UE 1350 can employ the systems (FIGS. 1-7, 11-12 and 14-16) and/or methods (FIGS. 8-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At UE 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from UE 1350 are received by antennas 1324, conditioned by receivers 1322, demodulated by a demodulator 1340, and processed by a RX data processor 1342 to extract the reverse link message transmitted by UE 1350. Further, processor 1330 can process the extracted message to determine which precoding matrix to use for determining the beamforming weights.

Processors 1330 and 1370 can direct (e.g., control, coordinate, manage, etc.) operation at base station 1310 and UE 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
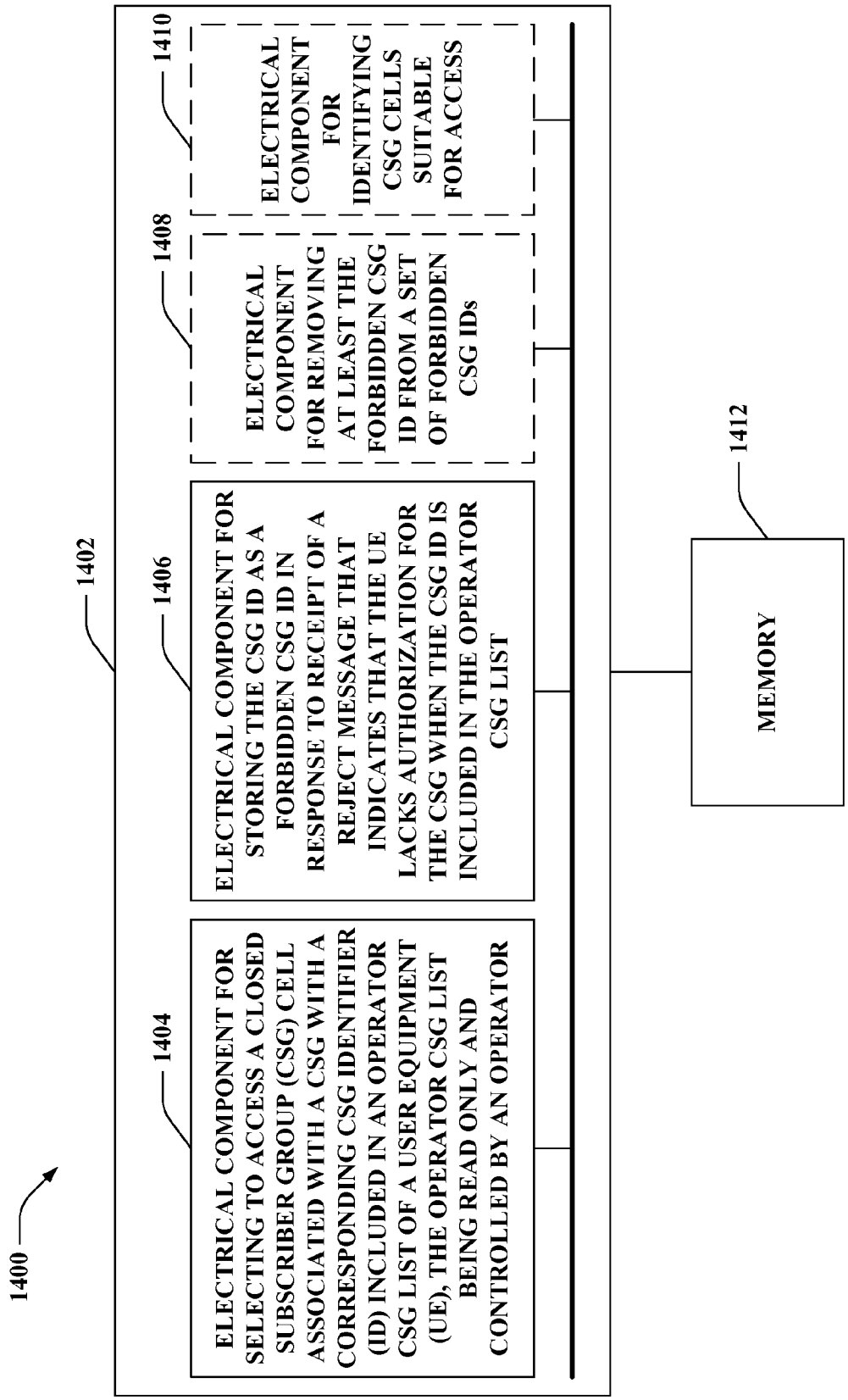
FIG. 14 is an illustration of an example system that enables managing access control in a wireless communication environment.

With reference to FIG. 14, illustrated is a system 1400 that enables managing access control in a wireless communication environment. For example, system 1400 can reside within a UE. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for selecting to access a Closed Subscriber Group (CSG) cell associated with a CSG with a corresponding CSG Identifier (ID) included in an operator CSG list of a user equipment (UE), the operator CSG list being read only and controlled by an operator 1404. Further, logical grouping 1402 can comprise an electrical component for storing the CSG ID as a forbidden CSG ID in response to receipt of a reject message that indicates that the UE lacks authorization for the CSG when the CSG ID is included in the operator CSG list 1406. Optionally, logical grouping 1402 can include an electrical component for removing at least the forbidden CSG ID from a set of forbidden CSG IDs 1408. Logical grouping 1402 can also optionally include an electrical component for identifying CSG cells suitable for access 1410. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
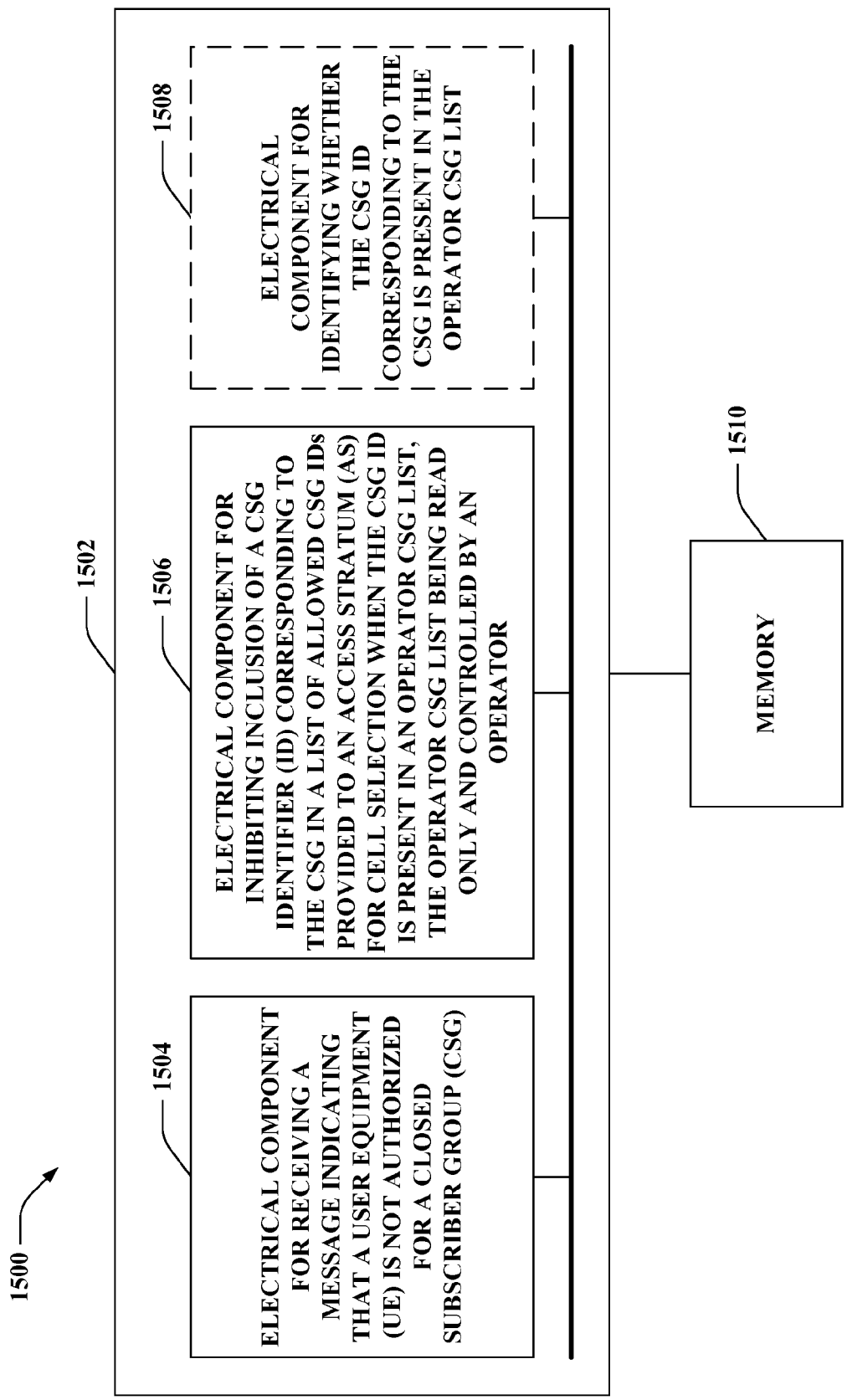
FIG. 15 is an illustration of an example system that enables detecting CSG cells suitable for access in a wireless communication environment.

With reference to FIG. 15, illustrated is a system 1500 that enables detecting CSG cells suitable for access in a wireless communication environment. For example, system 1500 can reside within a UE. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving a message indicating that a user equipment (UE) is not authorized for a Closed Subscriber Group (CSG) 1504. Further, logical grouping 1502 can include an electrical component for inhibiting inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator 1506. Logical grouping 1502 can also optionally include an electrical component for identifying whether the CSG ID corresponding to the CSG is present in the operator CSG list 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
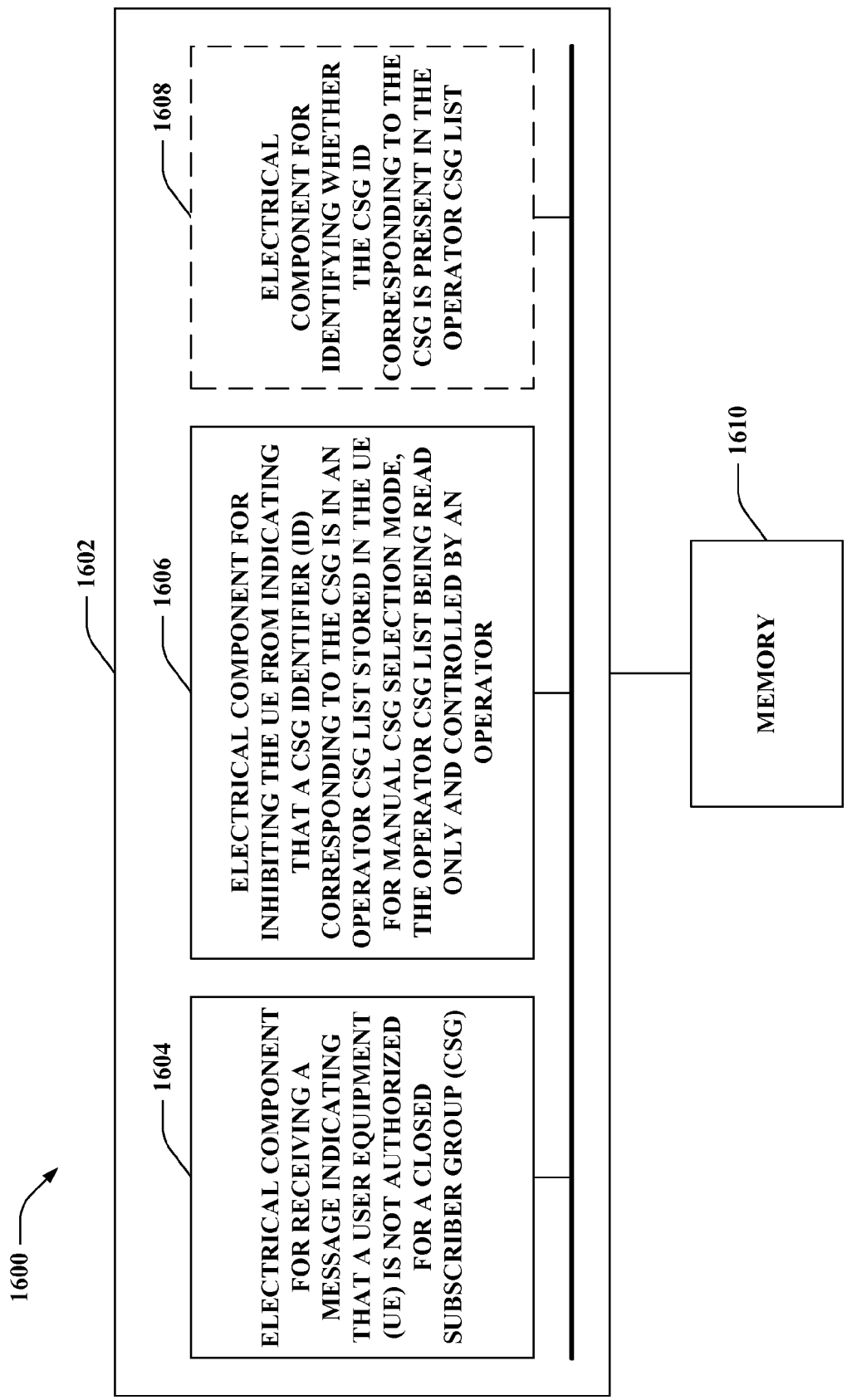
FIG. 16 is an illustration of an example system that enables displaying CSG IDs in connection with manual CSG selection mode in a wireless communication environment.

With reference to FIG. 16, illustrated is a system 1600 that enables displaying CSG IDs in connection with manual CSG selection mode in a wireless communication environment. For example, system 1600 can reside within a UE. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving a message indicating that a user equipment (UE) is not authorized for a Closed Subscriber Group (CSG) 1604. Moreover, logical grouping 1602 can include an electrical component for inhibiting the UE from indicating that a CSG Identifier (ID) corresponding to the CSG is in an operator CSG list stored in the UE for manual CSG selection mode, the operator CSG list being read only and controlled by an operator 1606. Additionally, logical grouping 1602 can optionally include an electrical component for identifying whether the CSG ID corresponding to the CSG is present in the operator CSG list 1608. Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
 selecting to access a Closed Subscriber Group (CSG) cell associated with a CSG with a corresponding CSG Identifier (ID) included in an operator CSG list of a user equipment (UE), the operator CSG list being read only and controlled by an operator;
 receiving a reject message that indicates the UE lacks authorization for the CSG; and
 storing the CSG ID as a forbidden CSG ID of the UE in a set of forbidden CSG IDs in response to receipt of the reject message when the CSG ID is included in the operator CSG list.

2. The method of claim 1, further comprising storing the forbidden CSG ID in a forbidden CSG list of the UE.

3. The method of claim 1, wherein the UE is removed from the CSG before the operator CSG list is updated to delete the CSG ID.

4. The method of claim 1, wherein a membership of the UE for the CSG expires before the operator CSG list is updated to delete the CSG ID.

5. The method of claim 1, wherein a given CSG cell associated with a given CSG with a corresponding CSG ID stored as a given forbidden CSG ID in the set of forbidden CSG IDs is considered unsuitable for access by the UE.

6. The method of claim 1, further comprising removing the set of forbidden CSG IDs from a set of CSG IDs included in the operator CSG list to yield a remaining subset of CSG IDs, wherein CSG cells associated with CSGs with corresponding CSG IDs included in the remaining subset of CSG IDs are considered suitable for access by the UE.

7. The method of claim 1, wherein CSG cells with forbidden CSG IDs are considered unsuitable for access by the UE.

8. The method of claim 1, wherein CSG cells with CSG IDs omitted from the operator CSG list and omitted from an allowed CSG list of the UE are considered unsuitable for access by the UE, the UE having read and write permissions for the allowed CSG list.

9. The method of claim 1, further comprising initiating an update of the operator CSG list when at least one forbidden CSG ID is stored.

10. The method of claim 9, further comprising initiating the update of the operator CSG list at a time of a next access when the at least one forbidden CSG ID is stored.

11. The method of claim 9, further comprising initiating the update of the operator CSG list after a predetermined length of time during which the at least one forbidden CSG ID is stored.

12. The method of claim 1, further comprising erasing the set of forbidden CSG IDs.

13. The method of claim 12, further comprising erasing the set of forbidden CSG IDs upon switching off the UE.

14. The method of claim 12, further comprising erasing the set of forbidden CSG IDs upon removal of a Universal Subscriber Identity Module (USIM) from the UE.

15. The method of claim 12, further comprising erasing the set of forbidden CSG IDs periodically.

16. The method of claim 12, further comprising erasing the set of forbidden CSG IDs upon the operator CSG list being updated.

17. The method of claim 1, further comprising storing a Public Land Mobile Network (PLMN) identity associated with the CSG cell with the forbidden CSG ID.

18. The method of claim 1, further comprising removing the CSG ID from the set of forbidden CSG IDs.

19. The method of claim 18, further comprising:
sending an attach request message to the CSG cell corresponding to the CSG ID stored as the forbidden CSG ID based upon a manual CSG selection;
receiving an attach accept message from the CSG cell in response to the attach request message; and
removing the CSG ID from the set of forbidden CSG IDs in response to receipt of the attach accept message.

20. The method of claim 18, further comprising:
sending a request message to the CSG cell corresponding to the CSG ID stored as the forbidden CSG ID based upon a manual CSG selection, wherein the request message is one of a tracking area update request message, a location area updating request message, or a routing area update request message;
receiving an accept message from the CSG cell in response to the request message, wherein the accept message is one of a tracking area update accept message, a location area updating accept message, or a routing area update accept message; and
removing the CSG ID from the set of forbidden CSG IDs in response to receipt of the accept message.

21. The method of claim 18, further comprising removing the CSG ID from the set of forbidden CSG IDs when the CSG ID is removed from the operator CSG list.

22. The method of claim 1, further comprising sending at least one of an attach request message, a detach request message, a tracking area update request message, a location area updating request message, or a routing area update request message upon selecting to access the CSG cell associated with the CSG with the corresponding CSG ID included in the operator CSG list.

23. The method of claim 1, further comprising inhibiting inclusion of the CSG ID in a list of allowed CSG identities provided to an Access Stratum (AS) for cell selection in response to receipt of the reject message when the CSG ID is included in the operator CSG list.

24. The method of claim 1, further comprising inhibiting display of the CSG ID as being in the operator CSG list for manual CSG selection mode upon the CSG ID being stored as the forbidden CSG ID.

25. The method of claim 1, further comprising inhibiting display of the CSG ID as being associated with a CSG for which the UE is a member when the CSG ID is stored as the forbidden CSG ID.

26. A wireless communications apparatus, comprising:
at least one processor configured to:
select to access a Closed Subscriber Group (CSG) cell associated with a CSG with a corresponding CSG Identifier (ID) included in an operator CSG list of a user equipment (UE), the operator CSG list being read only and controlled by an operator;
receive a reject message that indicates the UE lacks authorization for the CSG; and
retain the CSG ID as a forbidden CSG ID of the UE in a set of forbidden CSG IDs in response to receipt of the reject message when the CSG ID is included in the operator CSG list.

27. The wireless communications apparatus of claim 26, wherein at least one of the UE is removed from the CSG before the operator CSG list is updated to delete the CSG ID or a membership of the UE for the CSG expires before the operator CSG list is updated to delete the CSG ID.

28. The wireless communications apparatus of claim 26, wherein a given CSG cell is recognized as being one of suitable or unsuitable for access by the UE as a function of at least the operator CSG list and the set of forbidden CSG IDs.

29. The wireless communications apparatus of claim 26, further comprising:
at least one processor configured to:
initiate an update of the operator CSG list when at least one forbidden CSG ID is retained.

30. The wireless communications apparatus of claim 26, further comprising:
at least one processor configured to:
erase the set of forbidden CSG IDs at least one of upon switching off the UE, upon removal of a Universal Subscriber Identity Module (USIM) from the UE, periodically, or upon the operator CSG list being updated.

31. The wireless communications apparatus of claim 26, further comprising:
at least one processor configured to:
retain a Public Land Mobile Network (PLMN) identity associated with the CSG cell with the forbidden CSG ID.

32. The wireless communications apparatus of claim 26, further comprising:
at least one processor configured to:
remove the CSG ID from the set of forbidden CSG IDs upon receipt of an accept message from the CSG cell obtained in response to an attach request message sent as part of a manual CSG selection.

33. The wireless communications apparatus of claim 26, further comprising:
at least one processor configured to:
remove the CSG ID from the set of forbidden CSG IDs when the CSG ID is removed from the operator CSG list.

34. The wireless communications apparatus of claim 26, further comprising:
at least one processor configured to:
inhibit inclusion of the CSG ID in a list of allowed CSG identities provided to an Access Stratum (AS) for cell selection in response to receipt of the reject message when the CSG ID is included in the operator CSG list.

35. The wireless communications apparatus of claim 26, further comprising:
at least one processor configured to:
inhibit display of the CSG ID as being in the operator CSG list for manual CSG selection mode upon the CSG ID being stored as the forbidden CSG ID.

36. The wireless communications apparatus of claim 26, further comprising:
at least one processor configured to:
inhibit display of the CSG ID as being associated with a CSG for which the UE is a member when the CSG ID is retained as the forbidden CSG ID.

37. An apparatus, comprising:
means for selecting to access a Closed Subscriber Group (CSG) cell associated with a CSG with a corresponding CSG Identifier (ID) included in an operator CSG list of a user equipment (UE), the operator CSG list being read only and controlled by an operator; and
means for storing the CSG ID as a forbidden CSG ID in response to receipt of a reject message that indicates that the UE lacks authorization for the CSG when the CSG ID is included in the operator CSG list.

38. The apparatus of claim 37, further comprising means for removing at least the forbidden CSG ID from a set of forbidden CSG IDs.

39. The apparatus of claim 37, wherein a set of forbidden CSG IDs is erased.

40. The apparatus of claim 37, further comprising means for identifying CSG cells suitable for access.

41. The apparatus of claim 37, wherein at least one of the UE is removed from the CSG before the operator CSG list is updated to delete the CSG ID or a membership of the UE for the CSG expires before the operator CSG list is updated to delete the CSG ID.

42. A computer program product, comprising:
a non-transitory computer-readable medium comprising:
code for causing at least one computer to select to access a Closed Subscriber Group (CSG) cell associated with a CSG with a corresponding CSG Identifier (ID) included in an operator CSG list of a user equipment (UE), the operator CSG list being read only and controlled by an operator; and
code for causing at least one computer to store the CSG ID as a forbidden CSG ID in response to receipt of a reject message that indicates that the UE lacks authorization for the CSG when the CSG ID is included in the operator CSG list.

43. The computer program product of claim 42, wherein the computer-readable medium further comprises code for causing at least one computer to remove at least the forbidden CSG ID from a set of forbidden CSG IDs.

44. The computer program product of claim 43, wherein the set of forbidden CSG IDs is erased.

45. The computer program product of claim 42, wherein the computer-readable medium further comprises code for causing at least one computer to identify CSG cells suitable for access based upon the operator CSG list and a set of forbidden CSG IDs that includes the forbidden CSG ID.

46. The computer program product of claim 42, wherein at least one of the UE is removed from the CSG before the operator CSG list is updated to delete the CSG ID or a membership of the UE for the CSG expires before the operator CSG list is updated to delete the CSG ID.

47. An apparatus, comprising:
a selection component that selects to access a Closed Subscriber Group (CSG) cell associated with a CSG with a corresponding CSG Identifier (ID) included in an operator CSG list of a user equipment (UE), the operator CSG list being read only and controlled by an operator; and
a forbidden CSG management component that stores the CSG ID as a forbidden CSG ID in a set of forbidden CSG IDs in response to receipt of a reject message that indicates that the UE lacks authorization for the CSG when the CSG ID is included in the operator CSG list.

48. The apparatus of claim 47, further comprising a filter component that recognizes CSG cells that are suitable for access by the UE based upon the operator CSG list and the set of forbidden CSG IDs.

49. A method, comprising:
receiving a message indicating that a user equipment (UE) is not authorized for a Closed Subscriber Group (CSG);
recognizing whether a CSG Identifier (ID) corresponding to the CSG is present in an operator CSG list, the operator CSG list being read only and controlled by an operator; and
inhibiting inclusion of the CSG ID in a list of allowed CSG IDs provided to an Access Stratum (AS) for cell selection when the CSG ID is present in the operator CSG list.

50. The method of claim 49, wherein the list of allowed CSG IDs is provided to the AS by a Non-Access Stratum (NAS).

51. The method of claim 49, further comprising inhibiting the CSG ID from being included in the list of allowed CSG IDs for at least one of a period of time, until the UE is switched off, until a Universal Subscriber Identity Module (USIM) is removed from the UE, or the operator CSG list is updated.

52. A wireless communications apparatus, comprising:
at least one processor configured to:
receive a message indicating that a user equipment (UE) is not authorized for a Closed Subscriber Group (CSG);
recognize whether a CSG Identifier (ID) corresponding to the CSG is present in an operator CSG list, the operator CSG list being read only and controlled by an operator; and
inhibit inclusion of the CSG ID in a list of allowed CSG IDs provided to an Access Stratum (AS) for cell selection when the CSG ID is present in the operator CSG list.

53. The wireless communications apparatus of claim 52, wherein the list of allowed CSG IDs is provided to the AS by a Non-Access Stratum (NAS).

54. The wireless communications apparatus of claim 52, further comprising:
at least one processor configured to:
inhibit the CSG ID from being included in the list of allowed CSG IDs for at least one of a period of time, until the UE is switched off, until a Universal Subscriber Identity Module (USIM) is removed from the UE, or the operator CSG list is updated.

55. An apparatus, comprising:
means for receiving a message indicating that a user equipment (UE) is not authorized for a Closed Subscriber Group (CSG); and
means for inhibiting inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

56. The apparatus of claim 55, further comprising means for identifying whether the CSG ID corresponding to the CSG is present in the operator CSG list.

57. A computer program product, comprising:
a non-transitory computer-readable medium comprising:
code for causing at least one computer to receive a message indicating that a user equipment (UE) is not authorized for a Closed Subscriber Group (CSG); and
code for causing at least one computer to inhibit inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

58. The computer program product of claim 57, wherein the computer-readable medium further comprises code for causing at least one computer to identify whether the CSG ID corresponding to the CSG is present in the operator CSG list.

59. An apparatus, comprising:
a forbidden CSG management component that receives a message indicating that a user equipment (UE) is not authorized for a Closed Subscriber Group (CSG); and
a filter component that inhibits inclusion of a CSG Identifier (ID) corresponding to the CSG in a list of allowed CSG IDs provided to an Access Stratum (AS) for cell selection when the CSG ID is present in an operator CSG list, the operator CSG list being read only and controlled by an operator.

60. The apparatus of claim 59, the filter component inhibits the CSG ID from being included in the list of allowed CSG IDs for at least one of a period of time, until the UE is switched off, until a Universal Subscriber Identity Module (USIM) is removed from the UE, or the operator CSG list is updated.

61. A method, comprising:
receiving a message indicating that a user equipment (UE) is not authorized for a Closed Subscriber Group (CSG);
recognizing whether a CSG Identifier (ID) corresponding to the CSG is present in an operator CSG list, the operator CSG list being read only and controlled by an operator; and
inhibiting the UE from indicating that the CSG ID is in the operator CSG list stored in the UE for manual CSG selection mode.

62. The method of claim 61, further comprising inhibiting the UE from indicating that the CSG ID is in the operator CSG list stored in the UE for at least one of a period of time, until the UE is switched off, until a Universal Subscriber Identity Module (USIM) is removed from the UE, or until the operator CSG list is updated.

63. A wireless communications apparatus, comprising:
at least one processor configured to:
receive a message indicating that a user equipment (UE) is not authorized for a Closed Subscriber Group (CSG);
recognize whether a CSG Identifier (ID) corresponding to the CSG is present in an operator CSG list, the operator CSG list being read only and controlled by an operator; and
inhibit the UE from indicating that the CSG ID is in the operator CSG list stored in the UE for manual CSG selection mode.

64. The wireless communications apparatus of claim 63, further comprising:
at least one processor configured to:
inhibit the UE from indicating that the CSG ID is in the operator CSG list stored in the UE for at least one of a period of time, until the UE is switched off, until a Universal Subscriber Identity Module (USIM) is removed from the UE, or until the operator CSG list is updated.

65. An apparatus, comprising:
means for receiving a message indicating that a user equipment (UE) is not authorized for a Closed Subscriber Group (CSG); and
means for inhibiting the UE from indicating that a CSG Identifier (ID) corresponding to the CSG is in an operator CSG list stored in the UE for manual CSG selection mode, the operator CSG list being read only and controlled by an operator.

66. The apparatus of claim 65, further comprising means for identifying whether the CSG ID corresponding to the CSG is present in the operator CSG list.

67. A computer program product, comprising:
a non-transitory computer-readable medium comprising:
code for causing at least one computer to receive a message indicating that a user equipment (UE) is not authorized for a Closed Subscriber Group (CSG); and
code for causing at least one computer to inhibit the UE from indicating that a CSG Identifier (ID) corresponding to the CSG is in an operator CSG list stored in the UE for manual CSG selection mode, the operator CSG list being read only and controlled by an operator.

68. The computer program product of claim 67, wherein the computer-readable medium further comprises code for causing at least one computer to identify whether the CSG ID corresponding to the CSG is present in the operator CSG list.

69. An apparatus, comprising:
a display component that renders a list of Closed Subscriber Group (CSG) Identifiers (IDs) included in an operator CSG list stored in a user equipment (UE) for manual CSG selection, the operator CSG list being read only and controlled by an operator;
a forbidden CSG management component that receives a message indicating that the UE is not authorized for a CSG; and
a filter component that inhibits the display component from indicating that a CSG ID corresponding to the CSG is in the operator CSG list stored in the UE for manual CSG selection.

70. The apparatus of claim 69, the filter component inhibits the display component from indicating that the CSG ID corresponding to the CSG is in the operator CSG list stored in the UE for at least one of a period of time, until the UE is switched off, until a Universal Subscriber Identity Module (USIM) is removed from the UE, or until the operator CSG list is updated.

\* \* \* \* \*